United States Patent [19]
Ohtake

[11] 4,432,626
[45] Feb. 21, 1984

[54] SINGLE-LENS REFLEX TYPE VIEWFINDER AND METHOD OF ADJUSTING THE SAME

[75] Inventor: Yoshichi Ohtake, Kamakura, Japan

[73] Assignee: Victor Company of Japan, Limited, Yokohama, Japan

[21] Appl. No.: 330,863

[22] Filed: Dec. 15, 1981

[30] Foreign Application Priority Data

| Dec. 16, 1980 [JP] | Japan | 55-177468 |
| Dec. 20, 1980 [JP] | Japan | 55-180840 |
| Dec. 20, 1980 [JP] | Japan | 55-180841 |
| Dec. 29, 1980 [JP] | Japan | 55-185658 |
| Dec. 29, 1980 [JP] | Japan | 55-185659 |
| Dec. 30, 1980 [JP] | Japan | 55-188363 |

[51] Int. Cl.$^3$ .......................................... G03B 19/12
[52] U.S. Cl. .................................... 354/155; 354/225; 358/224; 350/561
[58] Field of Search ............... 354/155, 199, 224, 225; 352/140, 141; 358/224; 350/410, 445, 561, 572

[56] References Cited

U.S. PATENT DOCUMENTS

| 3,833,758 | 9/1974 | Ferrari | 358/224 |
| 3,914,034 | 10/1975 | Komine | 354/199 |
| 4,330,797 | 5/1982 | Yokokawa et al. | 358/224 |

Primary Examiner—A. A. Mathews
Attorney, Agent, or Firm—Lowe, King, Price & Becker

[57] ABSTRACT

A single-lens reflex type viewfinder as for VTR cameras has a prism for deflecting a portion of light coming through a main camera lens along a first optical axis to pass through a viewfinder master lens along a second optical axis normal to the first optical axis, and a mirror for reflecting the deflected light portion toward a viewfinder eyepiece along a third optical axis normal to the second optical axis and parallel to the first optical axis. The mirror is disposed on an image formation point of the viewfinder master lens to keep viewfinder and picked-up camera images in agreement with each other and hence to eliminate viewfinder adjustment. To remove any deviation of the viewfinder image from the third optical axis and eliminate any inclination of the viewfinder image, the mirror and/or prism is angularly movable about the first axis, the second axis, and/or the third axis.

14 Claims, 32 Drawing Figures

PRIOR ART

SINGLE-LENS REFLEX TYPE VIEWFINDER AND METHOD OF ADJUSTING THE SAME

BACKGROUND OF THE INVENTION

The present invention relates to a viewfinder of the single-lens reflex type for cameras such as VTR cameras, for example, and a method of adjusting such a viewfinder for eliminating any deviation of a viewfinder image from an optical axis of the viewfinder and any inclination of the viewfinder image in order to achieve complete agreement between the viewfinder image and an image focused on an image pickup device in the camera.

Viewfinders in cameras are required to give the operator a viewfinder image which agrees as accurately as possible with an image on a film or image pickup device in the camera. Twin-lens reflex cameras fail to produce such correct viewfinder images since the viewfinder image is formed by a ray of light coming through a viewfinder lens which is positionally different from the lens which focuses images on films or image pickup devices.

Many cameras in use today incorporate a single-lens reflex type viewfinder into which a portion of light passing through a main lens of the camera is guided so that images on the viewfinder and image pickup or focusing surface are identical with each other. Video tape recording (VTR) cameras include such single-lens reflex type viewfinders for the reasons that images on the viewfinder and the image pickup device are liable to be out of agreement as their size is relatively small, especially as compared with the size of images in 35 mm still cameras, and monitoring televisions are used while taking pictures to find any disagreement between a viewfinder image and a corresponding picked-up image.

Known single-lens reflex type viewfinders are however subject to machining and assembling errors which result in deviations of viewfinder images from an optical axis of the viewfinder or in inclined viewfinder images. Prior arrangements for correcting such image deviation or inclination include adjustment screws to incline a viewfinder mirror and prism, which however require a tedious and time-consuming trial-and-error procedure in order to get a proper viewfinder image.

SUMMARY OF THE INVENTION

A single-lens reflex type viewfinder for a VTR camera, for example, comprises a prism rotatable about a first optical axis extending through a main lens and an image pickup device of the camera or about a second optical axis extending through a viewfinder master lens perpendicularly to the first optical axis, and a mirror angularly rotatable about the second optical axis or about a third optical axis extending through an eyepiece of the viewfinder perpendicularly to the second optical axis and parallel to the first optical axis, to thereby attain desired degrees of deviation of a viewfinder image from the third optical axis and inclination of the viewfinder image for achieving agreement between the viewfinder image and an image focused on the image pickup device. The mirror is disposed on an image formation point of the viewfinder master lens or has a reflecting plane passing through a second principal point of the viewfinder master lens. The mirror may be angularly movable about an axis perpendicular to both the second and third axes or may be translatable to correct any vertical deviation of the viewfinder image from the third optical axis.

It is an object of the present invention to provide a single-lens reflex type viewfinder for a camera which will produce a viewfinder image in agreement with an image focused on an image pickup device of the camera even when a viewfinder mirror is assembled with errors.

Another object of the present invention is to provide a single-lens reflex type viewfinder for a camera which is capable of easy adjustment of any horizontal and vertical deviation of a viewfinder image from an optical axis of the viewfinder and any inclination of the viewfinder image as it is seen through an eyepiece of the viewfinder.

Still another object of the present invention is to provide a method of adjusting a single-lens reflex type viewfinder to correct such a deviation from the optical axis and an inclination of the viewfinder image.

BRIEF DESCRIPTION OF THE DRAWINGS

The above and other objects, features and advantages of the present invention will become more apparent from the following description when taken in conjunction with the accompanying drawings in which some preferred embodiments of the present invention are shown by way of illustrative embodiment.

DETAILED DESCRIPTION

Figure 1:
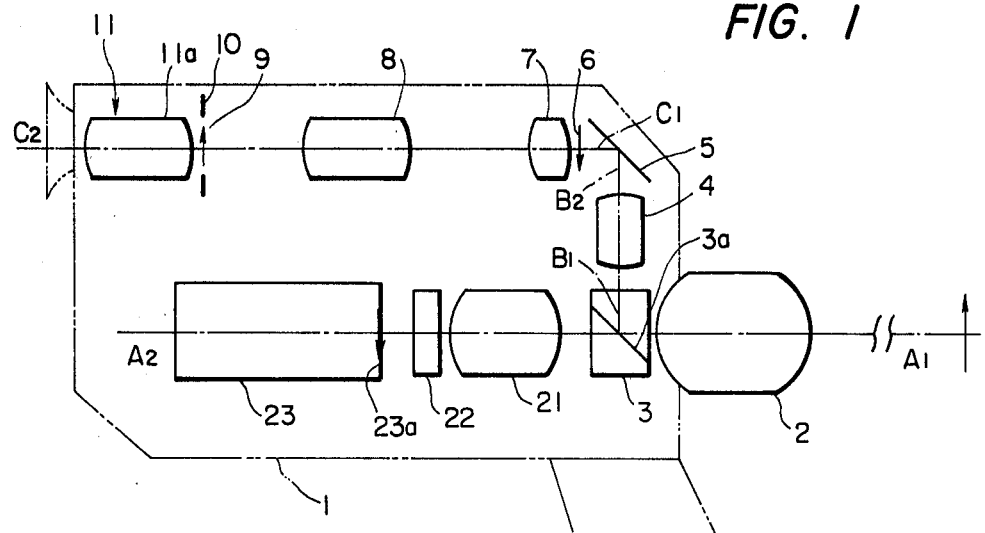
FIG. 1 is a schematic side elevational view of a VTR camera having a single-lens reflex type viewfinder.

As shown in FIG. 1, a video tape recording (VTR) camera has on a front end (righthand end as shown) a main or zoom lens 2 constituting an afocal system having a first optical axis $A_1$-$A_2$ (hereinafter referred to as "zoom optical axis") for passage therealong of light from an object. A prism 3 is disposed on the zoom optical axis $A_1$-$A_2$ and includes a half-mirror surface $3a$ inclined at an angle of 45 degrees to the zoom optical axis $A_1$-$A_2$ for deflecting a portion of the light coming through the zoom lens 2 to pass through a viewfinder master lens 4 along a second optical axis $B_1$-$B_2$ (hereinafter referred to as "VF master optical axis") extending substantially perpendicularly to the zoom optical axis $A_1$-$A_2$. The rest of the light which passes through the prism 3 goes along the zoom optical axis $A_1$-$A_2$. A mirror 5 is positioned on the VF master optical axis $B_1$-$B_2$ and has a reflecting surface inclined at an angle of 45 degrees thereto for reflecting the light coming through the viewfinder master lens 4 to pass along a third optical axis $C_1$-$C_2$ (hereinafter referred to as "VF optical axis") extending substantially perpendicularly to the VF master optical axis $B_1$-$B_2$ and parallel to the zoom optical axis $A_1$-$A_2$. The viewfinder master lens 4 defines a first image formation plane 6 and a second image formation plane 9 spaced at an interval along the VF optical axis $C_1$-$C_2$. Along the VF optical axis $C_1$-$C_2$, there are provided a field lens 7 and a relay lens 8 which jointly define the second image formation plane 9 where a VF mask 10 is positioned. An eyepiece 11 having a lens $11a$ is also disposed on the VF optical axis $C_1$-$C_2$ at an end of the VTR camera which is opposite to the zoom lens 2.

Along the zoom optical axis $A_1$-$A_2$, there are provided a master lens 21, a crystal filter 22, and a vidicon 23 having an end surface $23a$ facing the filter 22 for forming an image thereon.

Figure 2:
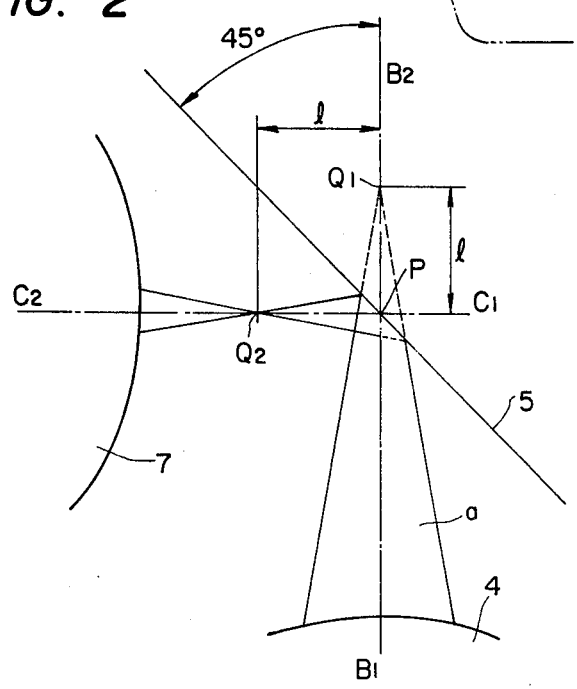
FIGS. 2, 3, and 4 are enlarged diagrammatic views showing paths of light as reflected by a viewfinder mirror, the views being illustrative of the conditions in which viewfinder images are in and out of agreement with images focused on an image pickup device in a camera.

With the camera having such a single-lens reflex type viewfinder, a viewfinder image as seen through the eyepiece 11 and an image focused on the image formation surface $23a$ of the vidicon 23 are formed by a ray of light passing through the zoom lens 2, and hence are in complete agreement from a theoretical viewpoint. In an actual construction, however, the images tend to be out of agreement due to machining and assembling errors with parts of the viewfinder. More specifically, as shown in FIG. 2, a ray of light a passing through the viewfinder master lens 4 would converge at a point $Q_1$ on the VF master optical axis $B_1$-$B_2$ without the mirror 5. With the mirror 5 being present on the VF master optical axis $B_1$-$B_2$ and crossing the latter at a point P, the light ray a is reflected from the mirror 5 and converges at an image formation point $Q_2$ on the VF optical axis $C_1$-$C_2$. Where the mirror 5 is inclined to the VF master optical axis $B_1$-$B_2$ exactly at 45 degrees, the following equation results:

$$PQ_1 = PQ_2 = l$$

where $l$ is the distance between the points P and $Q_1$.

Figure 3:
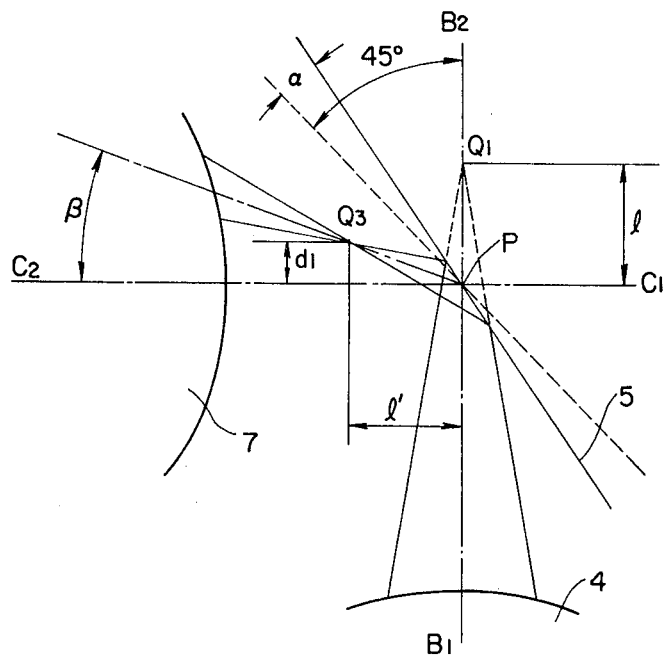

When the mirror 5 is angularly displaced $\alpha$ degrees from the 45-degree position as shown in FIG. 3, the light ray a converges at a point $Q_3$ on a straight line extending through a point P wherein the mirror 5 crosses the VF master optical axis $B_1$-$B_2$, and forming an angle $\beta$ with the VF optical line $C_1$-$C_2$. The following equations result from such an arrangement:

$$\beta = 2\alpha \tag{1}$$

$$l' = l \cos \beta = l \cos 2\alpha \tag{2}$$

$$d_1 = l \sin \beta = l \sin 2\alpha \tag{3}$$

$$d_2 = l - l' = l(1 - \cos 2\alpha) \tag{4}$$

where $d_1$ is the distance between the point $Q_3$ and the VF optical axis $C_1$-$C_2$, $l'$ is the distance between the point $Q_3$ and the VF master optical axis $B_1$-$B_2$, and $d_2$ is the difference between the distances $l$, $l'$. The distance $d_1$ in the equation (3) is indicative of a deviation from the VF optical axis $C_1$-$C_2$, and the distance $d_2$ in the equation (4) is indicative of an axial deviation of the image formation point $Q_3$. While the illustrated deviation $d_1$ is vertical with respect to the VTR camera, there also tends to be produced a horizontal deviation in a direction normal to the sheet of the drawing.

Figure 4:
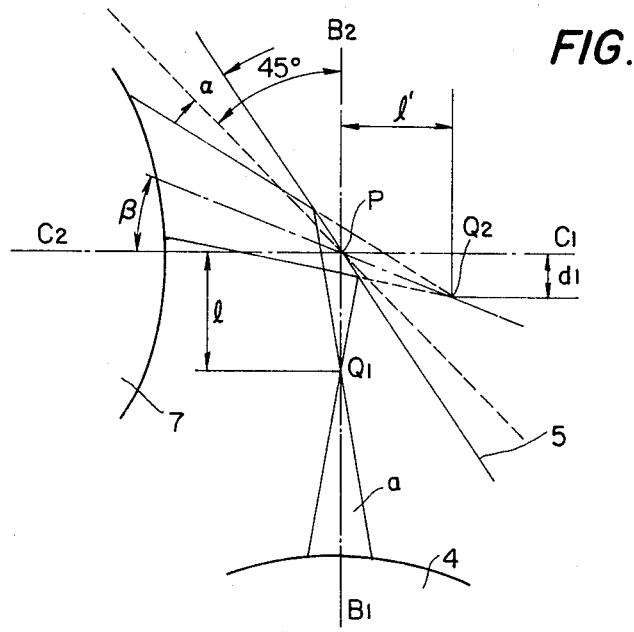

The above equations (1) through (4) hold true if the ray of light a forms an image at a point $Q_1$ in front of the point P on the VF master optical axis $B_1$-$B_2$ and the light ray a as reflected from the mirror 5 generates an apparent image formation point $Q_2$, as illustrated in FIG. 4.

To eliminate the deviations of a viewfinder image, it has been customary practice to adjust the position of the mask 10 and the relay lens 8 in the assembled VTR camera, a procedure which involves many adjustment steps and leads to an increased cost of the camera.

Figure 5A:
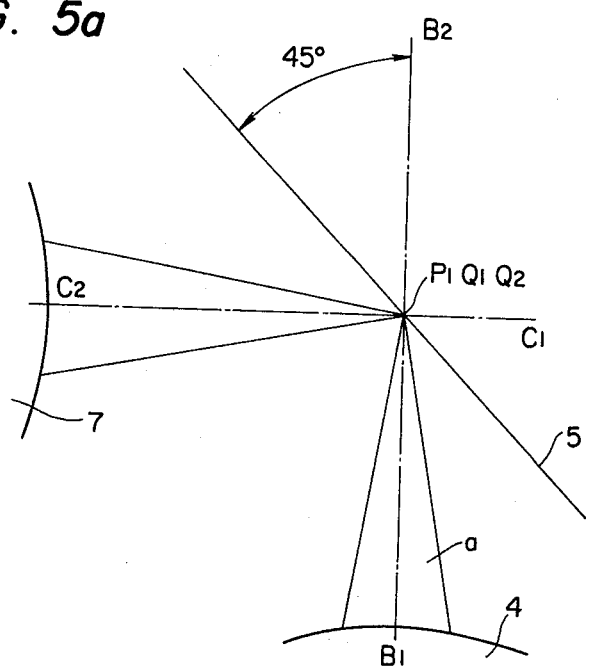
FIGS. 5a and 5b are enlarged diagrammatic views showing paths of light as reflected by a mirror in a single-reflex type viewfinder according to an embodiment of the present invention.
Figure 5B:
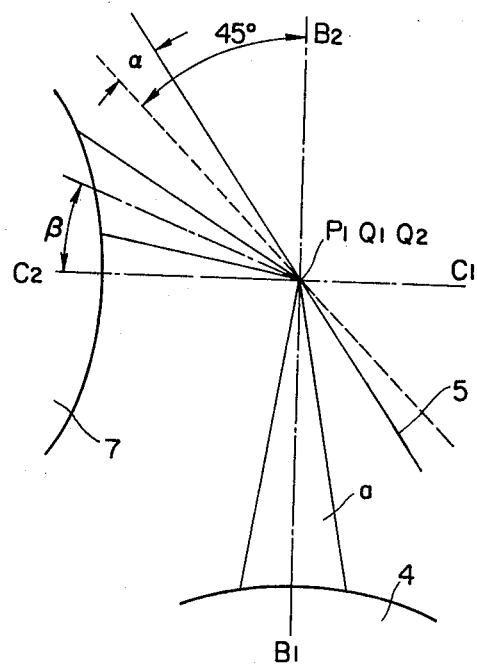

According to an embodiment of the present invention, a single-lens reflex type viewfinder is based on the principle that the distances $d_1$ and $d_2$ in the above equations (3), (4) and hence the deviation of the viewfinder image become zero when $l=0$. As shown in FIG. 5a, a ray of light a coming through the viewfinder master lens 4 converges and forms an image at the point $P_1$ where the mirror 5 crosses the VF master optical axis $B_1$-$B_2$ and is inclined thereto exactly at an angle of 45 degrees. In FIG. 5b, the mirror 5 is angularly displaced $\alpha$ degrees from the 45-degree position and crosses the VF master optical axis $B_1$-$B_2$ at the point $P_1$ in which the ray of light a converges and forms an image. In FIGS. 5a and 5b, the point $P_1$ and the points $Q_1$, $Q_2$ are in conformity with each other, and the following equations result:

$$P_2Q_1 = P_1Q_2 = l = 0 \tag{5}$$

$$d_1 = d_2 = 0 \tag{6}$$

These equations indicate that a viewfinder image formed in the viewfinder according to the foregoing embodiment is subject to no deviation from the VF optical axis and the image formation position is not displaced in the axial direction. No adjustment is required of the viewfinder as assembled, and complete agreement between viewfinder images and images on the image pickup device is achieved.

Figure 6A:
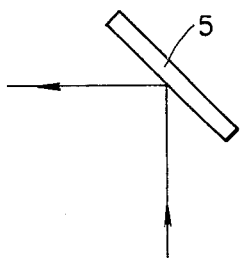
FIGS. 6a through 6d are side elevational views of different viewfinder mirrors according to the present invention.
Figure 6B:
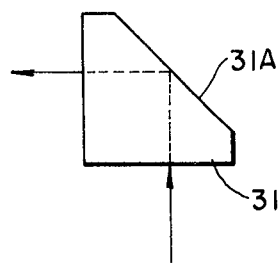
Figure 6C:
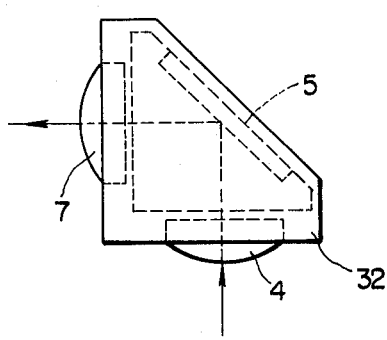
Figure 6D:
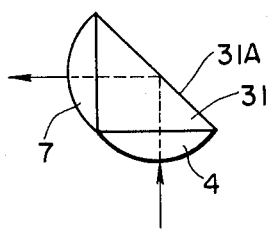

With the arrangement of the above embodiment, the viewfinder master lens has a first image formation plane which lies on the reflecting surface of the mirror 5, and, when the mirror 5 is left exposed as shown in FIG. 6a, any dust or dirt on the mirror surface is liable to be clearly seen through the eyepiece, resulting in an unsightly viewfinder image. To prevent dust or dirt from getting attached to the mirror surface, a variety of mirror structures are available. For example, a prism 31 has a slant surface 31A mirrored, that is, provided with a mirror coating, as shown in FIG. 6b. In FIG. 6c, the mirror 5 is fixedly mounted in a box 32 that supports on sides thereof a pair of lenses 4, 7 which are axially aligned with the VF master optical axis and the VF optical axis, respectively. Alternatively, a prism 31 having a slant mirrored surface 31A has on its mutually perpendicular sides a pair of lenses 4, 7 held in axial alignment with the VF master optical axis and the VF optical axis, respectively, as illustrated in FIG. 6d.

Figure 7:
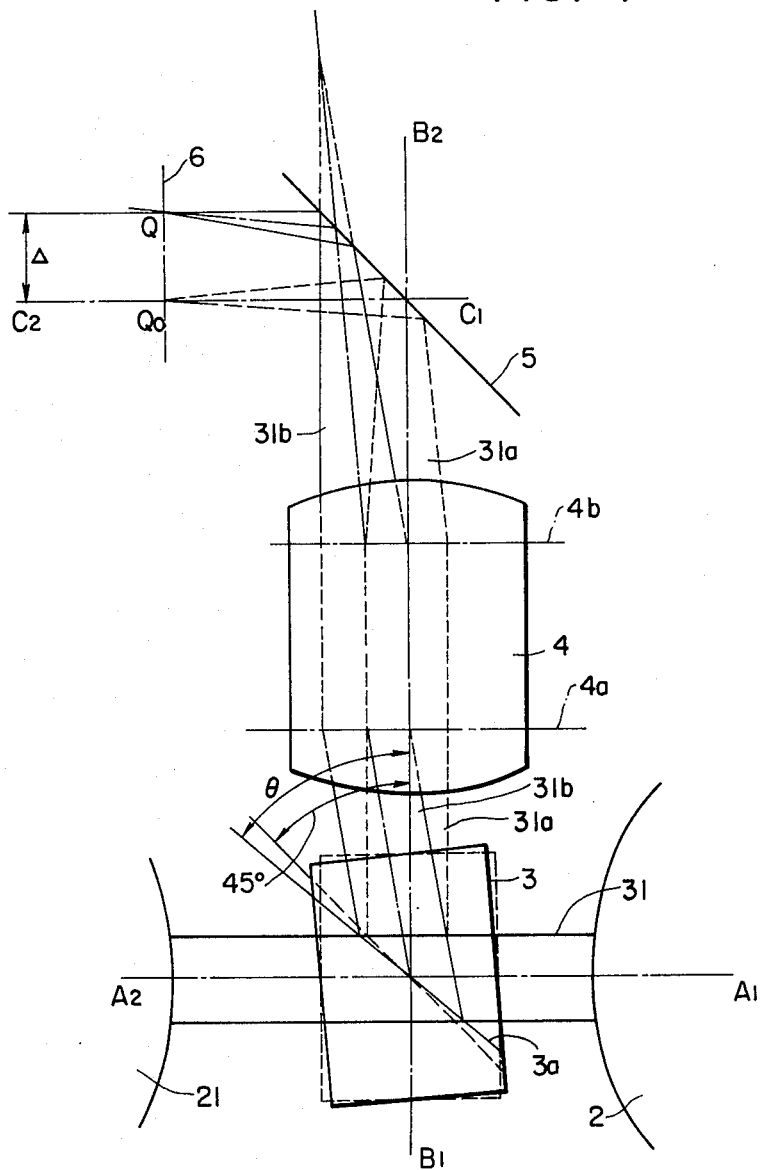
FIG. 7 is a diagrammatic view showing a deviation of a viewfinder image from an optical axis, which is caused by the tilting of a prism.

In FIG. 7, the mirror surface 3a of the prism 3 as shown in the solid line is tilted at an angle of $\theta$ which is not equal to 45 degrees. A ray of light 31 passing through the zoom lens 2 is partly reflected by the mirror surface 3a into a ray of light 31b which goes along a path inlined at an angle of incidence with respect to the VF master optical axis $B_1-B_2$ before reaching a first principal plane 4a of the viewfinder master lens 4. The light ray 31b travels parallel to the VF master optical axis $B_1-B_2$ between the first principal plane 4a and a second principal plane 4b of the viewfinder master lens 4. The ray of light 31b leaves the viewfinder master lens 4 at an angle equal to the angle of inclination, is reflected by the mirror 5, and forms an image at a point Q on the first image formation plane 6 of the viewfinder master lens 4.

When the prism 3 is installed as designed, that is, with the mirror surface 3a extending at 45 degrees to the axes $A_1-A_2$ and $B_1-B_2$, a ray of light 31a passes through the viewfinder master lens 4 and is reflected by the mirror 5 to form an image at a point $Q_0$. With the prism 3 tilted, therefore, a resultant viewfinder image is deviated, vertically as shown, by $\Delta = QQ_0$ from the VF optical axis $C_1-C_2$.

Where the prism 3 and/or the mirror 5 is inclined from a designed position, a viewfinder image can be seen as inclined through the eyepiece, a phenomenon called "image inclination".

These phenomena of image deviation and inclination should be removed by adjusting the viewfinder. Furthermore, there are some instances in which the viewfinder should be adjusted to cause a certain degree of image deviation from the optical axis even when the mirror and the prism are assembled in place without errors. For example, when the center of the VF mask is out of alignment with the VF optical axis $C_1-C_2$ while the center of the image focusing surface 23a is aligned with the zoom optical axis $A_1-A_2$, the center of viewfinder image does not conform with the center of the image focusing surface 23a, and hence adjustments should be made to eliminate such a disagreement.

Figure 9:
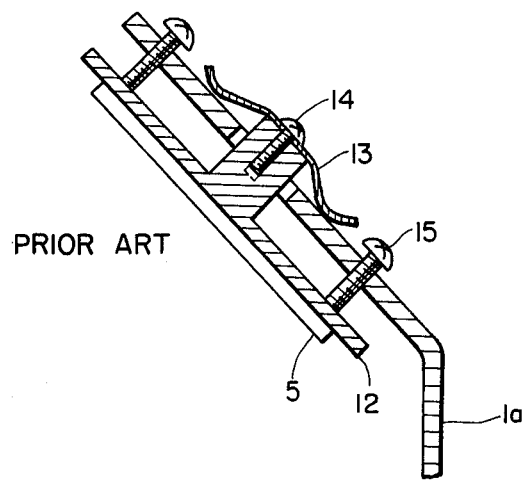
FIG. 9 is a cross-sectional view taken along line IX—IX of FIG. 8.
Figure 8:
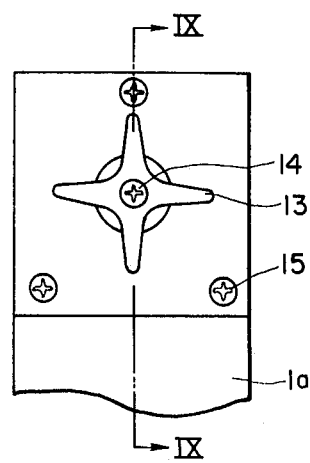
FIG. 8 is a plan view of a conventional mirror adjusting mechanism.
Figure 10:
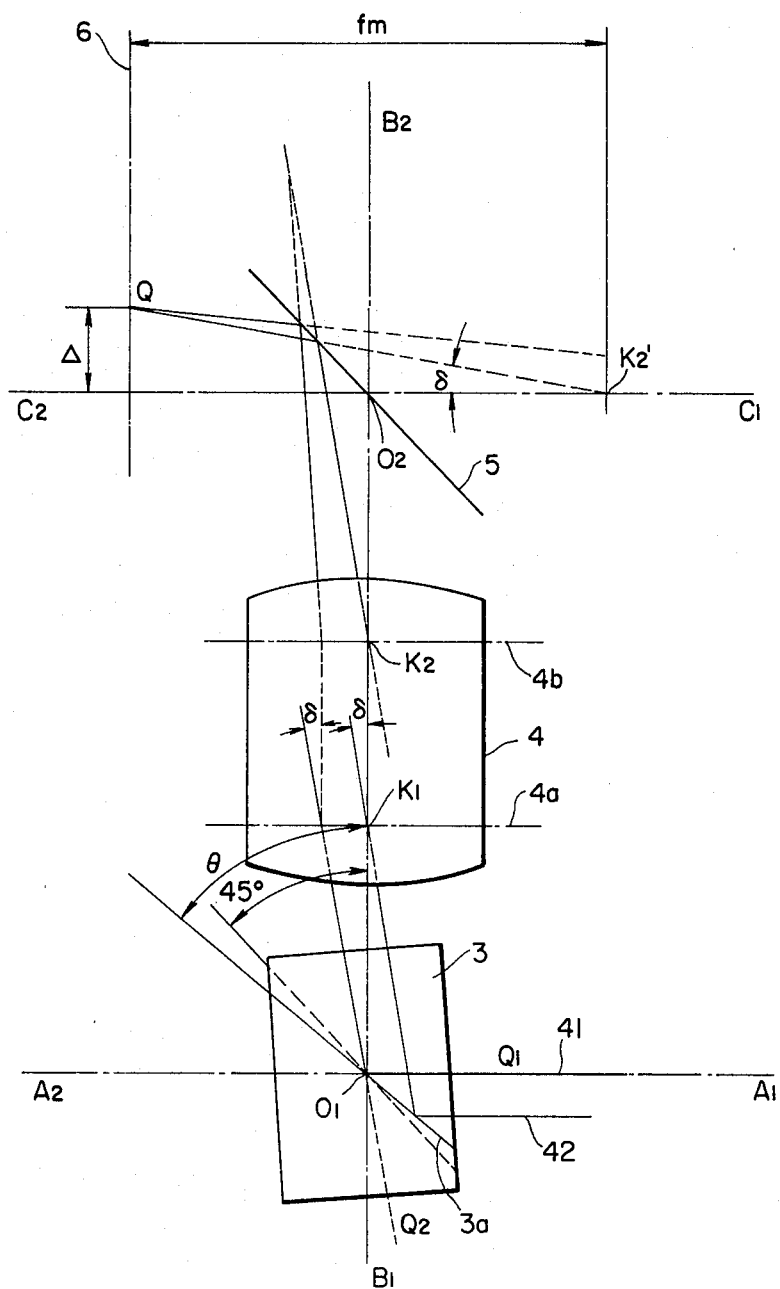
FIG. 10 is a diagrammatic view showing a two-dimensional analysis of a deviation of a viewfinder image from an optical axis with a mirror in a normal position and a prism tilted out of a normal position.

A conventional single-lens reflex type viewfinder has incorporated therein an adjusting mechanism as shown in FIGS. 8 and 9. The adjusting mechanism comprises a bracket 1a attached to the VTR camera 1 and supporting a mirror holder 12 resiliently mounted on the bracket 1a by a spring 13 secured to the mirror holder 12 by a screw 14. Three spaced adjustment screws 15 extend threadedly through the bracket 1a into abutting engagement with the mirror holder 12. The mirror holder 12 supports the mirror 5 on its surface facing away from the adjustment screws 15. The mirror 5 can be changed in its inclination with respect to the bracket 1a by turning all or some of the adjustment screws 15 to adjust any deviation and inclination of the viewfinder image.

With the illustrated prior adjusting arrangement, a screw adjusting operation would repeatedly be required to be made on a trial-and-error basis until a desired adjustment is reached since an attempt to correct a horizontal deviation of the viewfinder image from the optical axis is of necessity accompanied by occurence of a vertical deviation of the viewfinder image from the optical axis. The prism 3 has also conventionally been adjustable by a mechanism similar to that shown in FIGS. 8 and 9. However, an attempt to correct any deviation of the viewfinder from the optical axis by adjusting the prism 3 results in the generation of an image inclination, and conversely, a corrective action to adjust any image inclination tends to give rise to a deviation of the viewfinder image from the optical axis. Therefore, the prism 3 and/or the mirror 5 should repeatedly be adjusted on a trial-and-error basis until a desired viewfinder image is attained, a procedure which is quite tedious and time-consuming.

Other embodiments of the present invention will now be described. The present invention is based on the finding that deviations from an optical axis and inclinations of viewfinder images are caused due primarily to attachment of the prism and the mirror at improper angles. Before proceeding with the description, it is assumed that the parts other than the prism and the mirror are constructed and assembled properly as designed, and the prism produces no aberration. Although the ray of light as it passes through the prism 3 tilted as shown in FIG. 7 is somewhat refracted, the image formation point remains the same and hence the refraction is ignored in the drawings. Furthermore, where only the half-mirror surface 3a in the prism 3 is tilted from the 45-degree position, the image formation point is slightly displaced by the refraction which the ray of light undergoes when passing through the prism 3. However, such a displacement is extremely small as compared with any image deviation from the optical axis that is caused by the tilted half-mirror surface 3a, and hence is negligible as making no errors.

First, consideration will be given to the case where the mirror is disposed in its normal position and the prism is tilted out of position. In FIG. 4, a point $Q_1$ on a ray of light 41 passing along the zoom optical axis $A_1-A_2$ is partly reflected by the half-mirror surface 3a of the prism 3 which forms a virtual image $Q_2$ of the point $Q_1$. The ray of light 41 is reflected at the point $O_1$ on the half-mirror surface 3a where the zoom optical axis $A_1-A_2$ intersects the VF master optical axis $B_1-B_2$, and travels toward the viewfinder master lens 4 along a straight line passing through the points $Q_2O_1$. The ray of light 41 is tilted from the VF master optical axis $B_1-B_2$ through an angle of $\delta$, which can be expressed as a function of the angle of $(\theta - 45)$ through which the half-mirror surface 3a is angularly displaced from the reference 45-degree position, and also a function of the point $Q_1$, the angle of $\theta$ being formed between the VF master optical axis $B_1$-$B_2$ and the half-mirror surface 3a.

A ray of light 42 is assumed to travel parallel to the ray of light 41 and to be reflected by the half-mirror surface 3a toward the viewfinder master lens 4 along a line which passes through a first principal point $K_1$ of the viewfinder master lens 4. Since the rays of light 41, 42 form an image at the same point, finding the image formation point by the ray of light 42 automatically results in the discovery of the image formation point by the ray of light 41. The ray of light 42 goes out of the viewfinder master lens along a line extending through a second principal point $K_2$ of the viewfinder master lens 4 at the angle of $\delta$ to the VF master optical axis $B_1$-$B_2$, and is reflected by the mirror 5 toward the eyepiece 11a. Assuming that the mirror 5 forms a virtual image $K'_2$ of the point $K_2$, the ray of light 42 is reflected from the mirror 5 along a line extending at the angle of $\delta$ to the VF optical axis $C_1$-$C_2$. The ray of light 42 as reflected crosses the first image formation plane 6 of the viewfinder master lens, which is spaced from the virtual image $K'_2$ in a direction toward the eyepiece by a distance fm which is equal to the focal length of the viewfinder master lens 4. The point Q serves as the image formation point by a group of rays of light which include the rays of light 41, 42. Therefore, a deviation $\Delta$ of the viewfinder image from the VF optical axis $C_1$-$C_2$ can be found.

Figure 11:
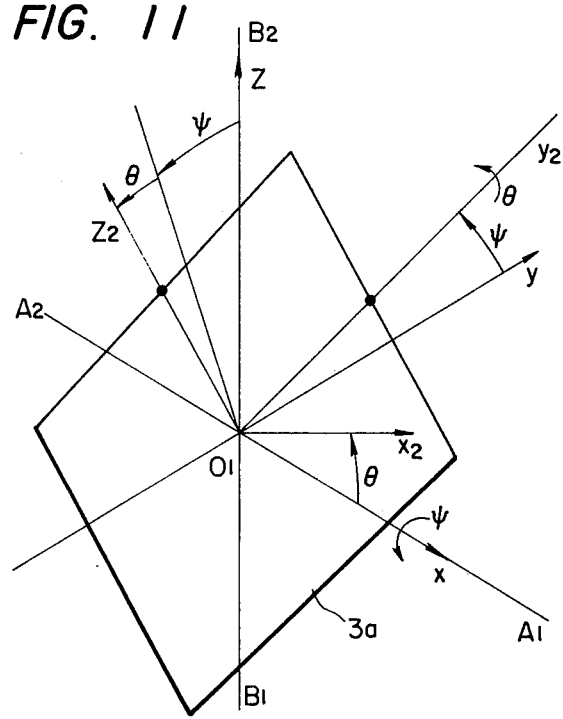
FIGS. 11 through 14 are diagrammatic views illustrative of a three-dimensional analysis of such a viewfinder image deviation.

The foregoing two-dimensional analysis will be utilized in principle for a three-dimensional analysis to derive equations to find deviations of a viewfinder image from the optical axis. As shown in FIG. 11, a coordinate system (x, y, z) is established which has a coordinate axis x on the zoom optical axis $A_1$-$A_2$, a coordinate axis z on the VF master optical axis $B_1$-$B_2$, and a coordinate axis y extending perpendicularly to both of the axes x, z, with a point $O_1$ being the origin. Another coordinate system ($x_2$, $y_2$, $z_2$) is created by rotating the xyz coordinate system about the x-axis through an angle of $\psi$ and then about the y-axis through an angle of $\theta$, the half-mirror surface 3a lying in a plane containing coordinate axes $y_2$, $z_2$.

Let the coordinates of a point $Q_1$ be (x, y, z) in the coordinate system xyz, and be ($x_2$, $y_2$, $z_2$) in the coordinate system $x_2 y_2 z_2$. The virtual image $Q_2$ formed of the point $Q_1$ by the half-mirror surface 3a has coordinates ($-x_2$, $y_2$, $z_2$). The virtual image $Q_2$ can be expressed in terms of the coordinate system xyz by coordinate transformation of the point $Q_1$ (x, y, z) into the corresponding point ($x_2$, $y_2$, $z_2$), by changing its coordinate $x_2$ into the coordinate $-x_2$, and by coordinate transformation back into the corresponding point in the coordinate system xyz. Coordinates (x, y, z) of the point $Q_2$ in the coordinate system xyz are given as follows:

$$\begin{pmatrix} \bar{x} \\ \bar{y} \\ \bar{z} \end{pmatrix} = \begin{pmatrix} 1 & 0 & 0 \\ 0 & \cos\psi & -\sin\psi \\ 0 & \sin\psi & \cos\psi \end{pmatrix} \begin{pmatrix} \cos\theta & 0 & -\sin\theta \\ 0 & 1 & 0 \\ \sin\theta & 0 & \cos\theta \end{pmatrix} \quad (7)$$

$$\begin{pmatrix} -1 & 0 & 0 \\ 0 & 1 & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix}$$

-continued $$\begin{pmatrix} 1 & 0 & 0 \\ 0 & \cos\psi & \sin\psi \\ 0 & \sin\psi & \cos\psi \end{pmatrix} \begin{pmatrix} x \\ y \\ z \end{pmatrix}$$

The above equation can be reduced to:

$$\begin{pmatrix} \bar{x} \\ \bar{y} \\ \bar{z} \end{pmatrix} = - \begin{pmatrix} \cos 2\theta, & -\sin\psi\sin 2\theta, \\ -\sin\psi\sin 2\theta, & -\cos^2\theta - \sin^2\psi\cos 2\theta, \\ \cos\psi\sin 2\theta, & -\sin\psi\cos\psi(1 - \cos 2\theta), \end{pmatrix} \quad (8)$$

$$\begin{pmatrix} \cos\psi\sin 2\theta \\ -\cos\psi\sin\psi(1 - \cos 2\theta) \\ -\sin^2\psi - \cos^2\psi\cos 2\theta \end{pmatrix} \begin{pmatrix} x \\ y \\ z \end{pmatrix}$$

Figure 12:
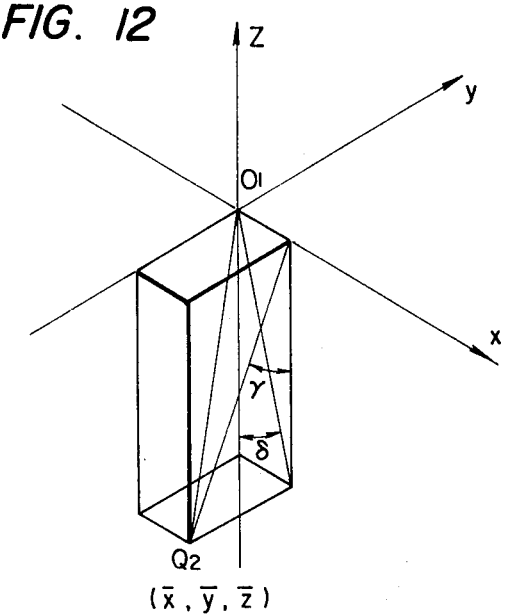

Let the angle formed between a straight line connecting between the virtual image $Q_1$ and the point $O_1$ and the z-axis be $\gamma$ as seen in the direction of the x-axis, and let the angle between this straight line and the z-axis be $\delta$ as seen in the direction of the y-axis, as illustrated in FIG. 12. These angles $\gamma$, $\delta$ are expressed by:

$$\tan\gamma = y/z \quad (9)$$

$$\tan\delta = -x/z \quad (10)$$

A study of these equations indicates that rays of light travelling parallel to the ray of light 41 passing through the points $Q_1 O_1$ are bent toward the viewfinder by rays of light parallel to the ray of light passing through the points $Q_2 O_1$, that is, rays of light travelling along the direction determined by the angles of $\gamma$, $\delta$. Out of these parallel rays of light, the ray of light 42 which travels toward the first principal point $K_1$ of the viewfinder master lens is followed to determine its image formation point. The other rays of light also converge at the image formation point thus found. The ray of light 42 enters the viewfinder master lens 4 in a direction toward the first principal point $K_1$ and leaves the second principal point $K_2$ out of the viewfinder master lens 4 along a line parallel to that direction. The ray of light 42 as it leaves the viewfinder master lens 4 is reflected from the mirror 5, and reaches the first image formation plane 6. The point Q where the ray of light 42 intersects the image formation line 6 serves as the image formation point for parallel lines including the rays of light 41, 42.

Figure 13:
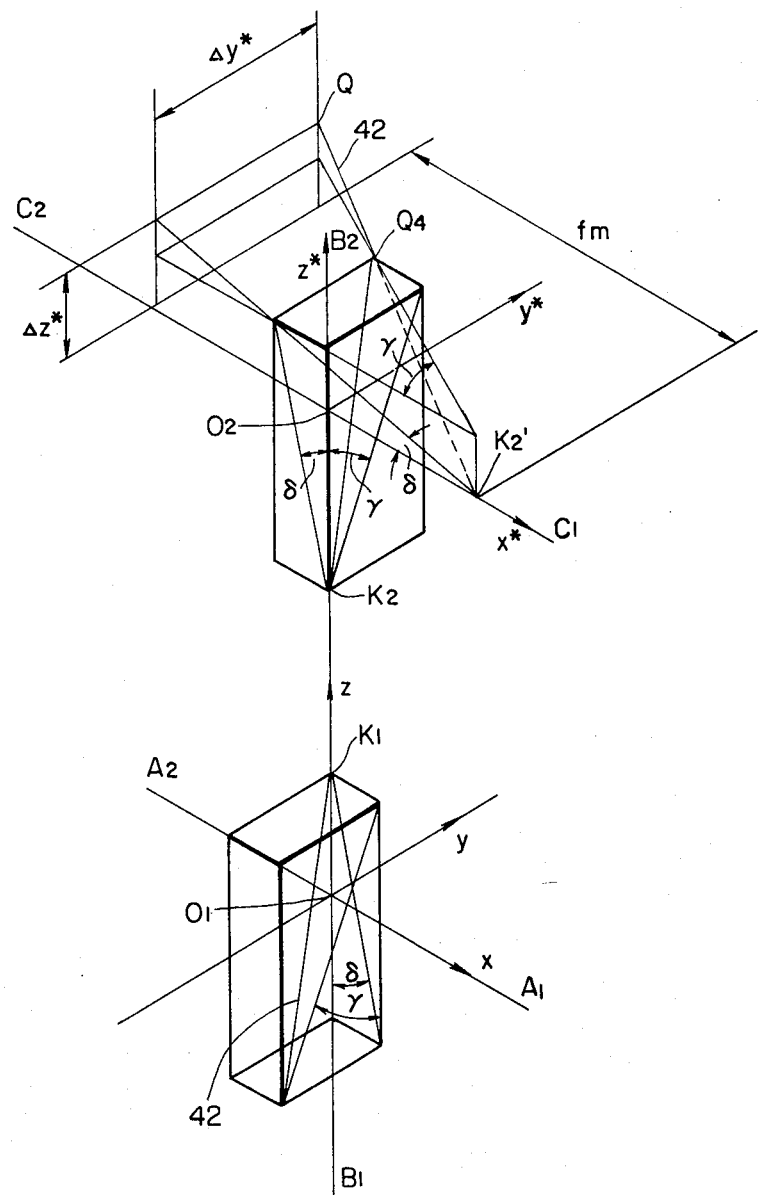

As shown in FIG. 13, there is established a coordinate system x*, y*, z* having an origin $O_2$ where the VF master optical axis $B_1$-$B_2$ intersects the VF optical axis $C_1$-$C_2$, a coordinate axis x* on the VF optical axis $C_1$-$C_2$, a coordinate axis z* on the VF master optical axis, and a coordinate axis y* extending perpendicularly to both of the coordinate axes x*, z*. The ray of light which is reflected by the mirror 5 goes along a straight line passing through the virtual image $K_2$, formed by the mirror 5 for the second principal point $K_2$ of the viewfinder master lens 4 and through a point $Q_4$ when the crosses the mirror 5. The angle formed between this straight line and the x*-axis as seen in the direction to the y*-axis is $\delta$, and the angle formed between the straight line and the x*-axis as seen in the direction of the z*-axis is $\gamma$. The position (y*, z*) of the image formation point on the image formation plane is expressed as follows:

$$y^* = fm \tan\gamma \quad (11)$$

$$z^* = fm \tan \delta \quad (12)$$

Substituting the equations (9), (10) in these equations (11), (12), $$y^* = fm \frac{\bar{y}}{\bar{z}} \quad (13)$$

$$z^* = fm \frac{\bar{x}}{\bar{z}} \quad (14)$$

If the prism 3 were not tilted, the ray of light passing through the points $Q_1O_1$ and parallel rays of light which travel in the direction of the zoom optical axis $A_1-A_2$ would form an image at the point where the VF optical axis $C_1-C_2$ intersects the first image formation plane 6 of the viewfinder master lens 4. Therefore, the distance between the VF optical axis $C_1-C_2$ and the image formation point for the parallel rays of light passing through the prism 3 as it is tilted through the angles of $\psi$, $(\theta - 45°)$ about the x-axis and the $y_2$-axis, respectively, represents deviations from the VF optical axis $C_1-C_2$. Let the coordinates of the point $Q_1$ on the zoom optical axis $A_1-A_2$ be (1, 0, 0), and deviations $\Delta y^*$, $\Delta z^*$ from the VF optical axis $C_1-C_2$ are equal to $y^*$, $z^*$ from the equations (13), (14) and are expressed by:

$$\begin{pmatrix} y^* \\ z^* \end{pmatrix} = -fm \begin{pmatrix} \tan\psi \\ \frac{+1}{\cos\psi\tan2\theta} \end{pmatrix} \quad (15)$$

It will be clear from the above equation that the deviation $\Delta y^*$ is a function of the angle of $\psi$ only and is not dependent on the angle of $\theta$. When the angle of $\psi$ is small and the angle of $\theta$ is close to 45 degrees, $\cos\psi \approx 1$ and $|\tan 2\theta|$ becomes quite large, resulting in $\cos\psi << |\tan 2\theta|$. Thus, the equation (15) can be rewritten as:

$$\begin{pmatrix} y^* \\ z^* \end{pmatrix} = -fm \begin{pmatrix} \tan\psi \\ \frac{1}{\tan2\theta} \end{pmatrix} \quad (16)$$

It will be seen from the equation (16) that when the prism 3 is rotated about the x-axis (zoom optical axis $A_1-A_2$) through a relatively small angle, the optical axis is displaced mainly horizontally, and when the prism 3 is rotated about the $y_2$-axis through a relatively small angle, the optical axis is displaced mainly horizontally. The foregoing would hold if the above axes of rotation were translated since the optical axes would not be changed by translation of the prism 3.

It is assumed that there are two points $Q_1$, $P_1$ on a plane containing the x-axis and the y-axis, and the point $P_1$ (not shown) is not on a straight line passing through the points $Q_1O_1$. If the prism 3 were in its normal position, rays of light passing through the points $Q_1O_1$ and $P_1O_1$ would form images on the first image formation plane of the viewfinder master lens 4 at points $Q_1P_1$ respectively, and a straight line QP would be parallel to the y*-axis. When the prism 3 is tilted, the straight line QP is inclined with respects to the y*-axis, a phenomenon that is called an "image inclination". Let the coordinates of the points Q, P be $(y_1^*, z_1^*)$, $(y_2^*, z_2^*)$, respectively, and the image inclination H can be given by the following equation:

$$H = \tan^{-1} \frac{z_2^* - z_1^*}{y_2^* - y_1^*} \quad (17)$$

Let the coordinates of the points Q, P be (1, 0, 0), (1, −1, 0), respectively, the point Q can be expressed by the equation (15) and the point P can be given by the following equation:

$$\begin{pmatrix} y_2^* \\ z_2^* \end{pmatrix} = -fm \begin{pmatrix} \frac{\cos\psi\sin2\theta - \cos^2\psi - \sin^2\psi\cos2\theta}{\cos\psi\sin2\theta + \sin\psi\cos\psi(1 - \cos2\theta)} \\ \frac{\cos2\theta + \sin\psi\sin2\theta}{\cos\psi\sin2\theta + \sin\psi\cos\psi(1 - \cos2\theta)} \end{pmatrix} \quad (18)$$

When the angle of $\psi$ is small and the angle of $\theta$ is near 45 degrees, approximate solutions are as follows:

$$\left.\begin{array}{l} y_1^* = -0.01745fm\psi \\ z_1^* = -0.0349fm(45 - \theta) \\ H = -\psi \end{array}\right\} \quad (19)$$

Therefore, $y_1^*$ and H are a function of $\psi$, and $z_1^*$ is a function of $\theta$.

Figure 15:
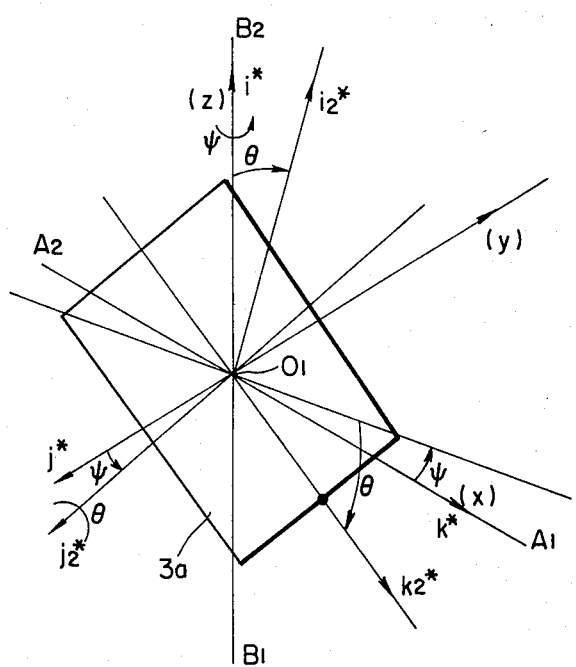
FIG. 15 is a diagrammatic view showing another three-dimensional analysis of a deviation of a viewfinder image from an optical axis.

Another three-dimensional analysis to derive equations for finding deviations of a viewfinder image from the optical axis will be described with reference to FIG. 15. A coordinate system (x, y, z) is established which has a coordinate axis x on the zoom optical axis $A_1-A_2$, a coordinate axis z on the VF master optical axis $B_1-B_2$, and a coordinate axis y extending perpendicularly to both of the axes x, z, with a point $O_1$ being the origin. Another coordinate system (i*, J*, k*) having a coordinate axis i* in the direction of the z-axis, a coordinate axis j* in the direction of the y-axis, and a coordinate axis k* in the direction of the x-axis is rotated first about the i*-axis through an angle of $\psi$ and then about the j*-axis about an angle of $\theta$, creating still another coordinate system ($i_2^*$, $j_2^*$, $k_2^*$). The half-mirror surface $3a$ lies in a plane including coordinate axes $j_2^*$, $k_2^*$.

Let the coordinates of a point $Q_1$ be (i, j, k) in the coordinate system i*j*k*, and be ($i_2^*$, $j_2^*$, $k_2^*$) in the coordinate system $i_2^*j_2^*k_2^*$. The virtual image $Q_2$ formed of the point $Q_1$ by the half-mirror surface $3a$ has coordinates ($-i_2^*$, $j_2^*$, $k_2^*$). The virtual image $Q_2$ can be expressed in terms of the coordinate system i*j*k* by coordinate transformation of the point $Q_1$ (i*, j*, k*), by changing the coordinate $i_2^*$ into the coordinate $-i_2^*$, and by coordinate transformation back into the corresponding point in the coordinate system i*j*k*. Coordinates (i*, j*, k*) of the point $Q_2$ in the coordinate system i*j*k* are given as follows:

$$\begin{pmatrix} i^* \\ j^* \\ k^* \end{pmatrix} = \begin{pmatrix} 1 & 0 & 0 \\ 0 & \cos\psi & -\sin\psi \\ 0 & \sin\psi & \cos\psi \end{pmatrix} \begin{pmatrix} \cos\theta & 0 & -\sin\theta \\ 0 & 1 & 0 \\ \sin\theta & 0 & \cos\theta \end{pmatrix} \quad (20)$$

$$\begin{pmatrix} -1 & 0 & 0 \\ 0 & 1 & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix}$$

-continued $$\begin{pmatrix} 1 & 0 & 0 \\ 0 & \cos\psi & \sin\psi \\ 0 & -\sin\psi & \cos\psi \end{pmatrix} \begin{pmatrix} i^* \\ j^* \\ k^* \end{pmatrix}$$

The above equation can be reduced to:

$$\begin{pmatrix} \bar{i}^* \\ \bar{j}^* \\ \bar{k}^* \end{pmatrix} = - \begin{pmatrix} \cos2\theta & -\sin\psi\sin2\theta, & \cos\psi\sin2\theta \\ -\sin\psi\cos2\theta, & -\cos^2\psi - \sin^2\psi\cos2\theta, & -\cos\psi\sin\psi(1-\cos2\theta) \\ \cos\psi\sin2\theta & -\sin\psi\cos\psi(1-\cos2\theta), & -\sin^2\psi - \cos^2\psi\cos2\theta \end{pmatrix} \begin{pmatrix} i^* \\ j^* \\ k^* \end{pmatrix} \quad (21)$$

Let the coordinates of a point $(i,j,k)$ be $(x,y,z)$ in the coordinate system xyz, and then the following equation results:

$$\begin{pmatrix} \bar{x} \\ \bar{y} \\ \bar{z} \end{pmatrix} = \begin{pmatrix} \bar{k}^* \\ -\bar{j}^* \\ \bar{i}^* \end{pmatrix} = - \begin{pmatrix} \cos\psi\sin2\theta, \\ \sin\psi\sin2\theta, \\ \cos2\theta \end{pmatrix} \quad (22)$$

$$\begin{pmatrix} -\sin\psi\cos\psi(1-\cos2\theta), & -\sin^2\psi - \cos^2\theta\cos2\theta \\ \cos^2\psi + \sin^2\psi\cos2\theta, & \cos\psi\sin\psi(1-\cos2\theta) \\ -\sin\psi\sin2\theta & \cos\psi\sin2\theta \end{pmatrix} \begin{pmatrix} i^* \\ j^* \\ k^* \end{pmatrix}$$

As shown in FIG. 12, let the angle formed between a straight line connecting between the virtual image $Q_2$ and the point $O_1$ and the z-axis be $\gamma$ as seen in the direction of the x-axis, and let the angle between this straight line and the z-axis be $\delta$ as seen in the direction of the y-axis. These angles $\gamma, \delta$ are given by:

$$\tan\gamma = y/z \quad (23)$$

$$\tan\delta = -x/z \quad (24)$$

A study of these equations indicates that rays of light travelling parallel to the ray of light 41 passing through the points $Q_1O_1$ are bent toward the viewfinder by rays of light parallel to the ray of light passing through the points $Q_2O_1$, that is, rays of light travelling along the direction determined by the angles of $\gamma$, $\delta$. Out of these parallel rays of light, the ray of light 42 which travels toward the first principal point $K_1$ of the viewfinder master lens is followed to its image formation point. The other rays of light also converge at the image formation point thus found. The ray of light 42 enters the viewfinder master lens 4 in a direction toward the first principal point $K_1$ and leaves the second principal point $K_2$ out of the viewfinder master lens 4 along a line parallel to that direction. The ray of light 42 as it leaves the viewfinder master lens 4 is reflected from the mirror 5, and reaches the first image formation plane 6. The point Q where the ray of light 42 intersects the image formation line 6 serves as the image formation point for parallel lines including the rays of light 41, 42.

As shown in FIG. 13, there is established a coordinate system $x^*$, $y^*$, $z^*$ having an origin $O_2$ where the VF master optical axis $B_1$-$B_2$ intersects the VF optical axis $C_1$-$C_2$, a coordinate axis $x^*$ on the VF optical axis $C_1$-$C_2$, a coordinate axis $z^*$ on the VF master optical axis, and a coordinate axis $y^*$ extending perpendicularly to both of the coordinate axes $x^*$, $z^*$. The ray of light which is reflected by the mirror 5 goes along a straight line passing through the virtual image $K_2'$, formed by the mirror 5 for the second principal point $K_2$ of the viewfinder master lens 4 and through a point $Q_4$ where the ray crosses the mirror 5. The angle formed between this straight line and the $x^*$-axis as seen in the direction to the $y^*$-axis is $\delta$, and the angle formed between the straight line and the $x^*$-axis as seen in the direction of the $z^*$-axis is $\gamma$. The position $(y^*, z^*)$ of the image formation point on the image formation plane is expressed as follows:

$$y^* = fm \tan\gamma \quad (25)$$

$$z^* = fm \tan\delta \quad (26)$$

Substituting the equations (9), (10) in these equations (11), (12), $$y^* = fm \frac{\bar{y}}{\bar{z}} \quad (27)$$

$$z^* = fm \frac{\bar{x}}{\bar{z}} \quad (28)$$

If the prism 3 were not tilted, the ray of light passing through the points $Q_1O_1$ and parallel rays of light which travel in the direction of the zoom optical axis $A_1$-$A_2$ would form an image at the point where the VF optical axis $C_1$-$C_2$ intersects the first image formation plane 6 of the viewfinder master lens 4. Therefore, the distance between the VF optical axis $C_1$-$C_2$ and the image formation point for the parallel rays of light passing through the prism 3 as it is tilted through the angles of $\psi$, $(\theta - 45°)$ about the x-axis and the $y_2$-axis, respectively, represents deviations from the VF optical axis $C_1$-$C_2$. Let the coordinates of the point $Q_1$ $(i^*, j^*, k^*)$ on the zoom optical axis $A_1$-$A_2$ be $(0, 0, 1)$, and deviations $\Delta y^*$, $\Delta z^*$ from the VF optical axis $C_1$-$C_2$ are equal to $y^*$, $z^*$ from the equations (27), (28) and are expressed by:

$$\begin{pmatrix} y^* \\ z^* \end{pmatrix} = -fm \begin{pmatrix} \dfrac{-\sin\psi(1-\cos2\theta)}{\sin2\theta} \\ \dfrac{-\sin^2\psi - \cos^2\psi\cos2\theta}{\cos\psi\sin2\theta} \end{pmatrix} \quad (29)$$

The foregoing would hold if the above axes of rotation were translated since the optical axes would not be changed by translation of the prism 3.

Figure 14:
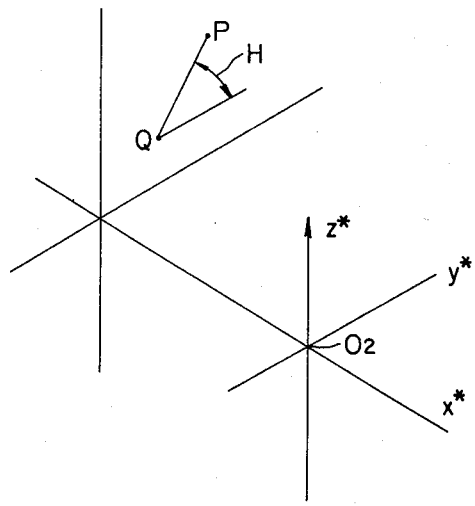

It is assumed that there are two points $Q_1$, $P_1$ on a plane containing the $y^*$-axis and $k^*$-axis, and the point $P_1$ (not shown) is not on a straight line passing through the points $Q_1O_1$. If the prism 3 were in its normal position, rays of light travelling through the points $Q_1O_1$ and $P_1O_1$ would form images on the first image formation plane of the viewfinder master lens and on a plane containing the $x^*$-axis and the $y^*$-axis respectively at image formation points Q,P, and a straight line QP would be parallel to the $y^*$-axis. When the prism 3 is tilted, the straight line PQ is inclined with respect to the $y^*$-axis as shown in FIG. 14, causing an image inclination. Let the coordinates of the points Q, P be $(y_1^*, z_1^*)$ and ($y_2^*$, $z_2^*$), and the image inclination H can be expressed by:

$$H = \tan^{-1} \frac{z_2^* - z_1^*}{y_2^* - y_1^*} \tag{30}$$

Let the coordinates of the points $Q_1$, $P_1$ be ($i^*$, $j^*$, $k^*$)=(0, 0, 1) and ($i^*$, $j^*$, $k^*$)=(0, 1, 1), respectively, and the point Q can be given by the equation (29) and the point P can be expressed by the following equation:

$$\begin{pmatrix} y_2^* \\ z_2^* \end{pmatrix} = \tag{31}$$

$$-fm \left( \begin{array}{c} \dfrac{\cos^2\psi + \sin^2\psi\cos2\theta + \cos\psi\sin\psi(1 - \cos2\theta)}{-\sin\psi\sin2\theta + \cos\psi\sin2\theta} \\[6pt] \dfrac{-\sin\psi\cos\psi(1 - \cos2\theta) - \sin^2\psi - \cos^2\psi\cos2\theta}{-\sin\psi\sin2\theta + \cos\psi\sin2\theta} \end{array} \right)$$

When the angle of $\psi$ is small and the angle of $\theta$ is near 45 degrees, approximate solutions are as follows:

$$\left. \begin{array}{l} y_1^* = +0.01745 fm\psi \\ z_1^* = +0.0349 fm(45 - \theta) \\ H = +\psi \end{array} \right\} \tag{32}$$

A study of the above equation shows that when $\psi$ is small and $\theta$ is close th 45 degrees, $y_1^*$ and H are a function of $\psi$, and $z_1^*$ is a function of $\theta$.

Figure 16:
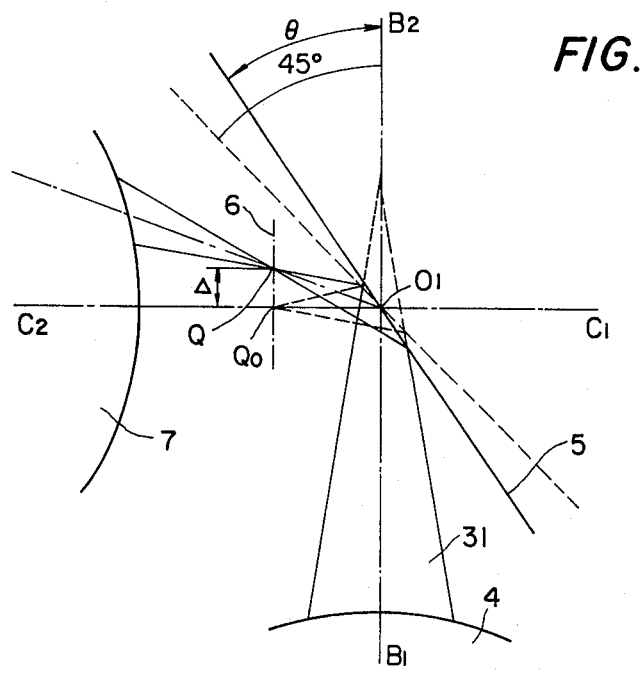
FIGS. 16 and 17 are diagrammatic views showing a two-dimensional analysis of a deviation of a viewfinder image from an optical axis with a prism in a normal position and a mirror tilted out of a normal position.

The situation in which the prism 3 is formed and assembled as designed and the mirror 5 is tilted out of its normal position will now be considered. If the mirror 5 were in its normal position, that is, inclined at an angle of 45 degrees from the VF master optical axis $B_1$-$B_2$ as shown by the dotted line in FIG. 16, a beam of light 31 that has entered the prism 3 parallel to the zoom optical axis $A_1$-$A_2$ and left the VF master lens 4 would be reflected from the mirror 5 to form an image at a point $Q_0$ on the VF optical axis $C_1$-$C_2$.

Figure 17:
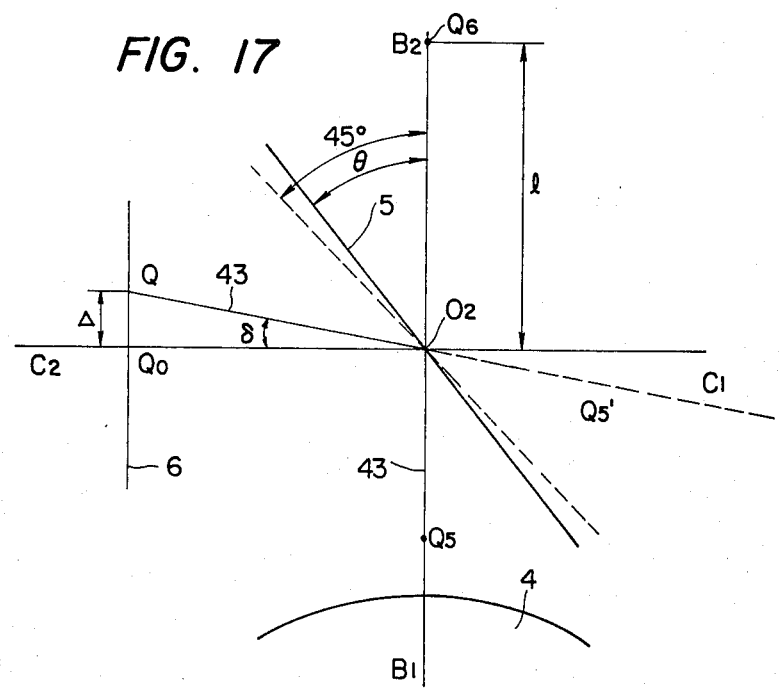

When the mirror 5 is tilted out of the normal 45-degree position, or at an angle of $\theta$ ($\theta \neq 45$ degrees) with respect to the VF master optical axis $B_1$-$B_2$, an image is formed at a point Q on the first image formation plane 6 which is spaced a distance of $\Delta$ from the VF optical axis $C_1$-$C_2$. As illustrated in FIG. 17, a point $Q_5$ on a ray of light 43 which travels along the VF master optical axis $B_1$-$B_2$ has its virtual image $Q_5$ formed by the mirror 5. The ray of light 43 passes through the point $Q_5$, and is reflected by the mirror 5 at a point $O_2$ where the VF optical axis $B_1$-$B_2$ crosses the mirror 5, in a direction toward the eyepiece lens 11a along a line extending through the points $Q_5, O_2$. The ray of light 43 as reflected goes along the line which is angularly spaced from the VF optical axis $C_1$-$C_2$ by an angle of $\delta$ which is a function of an inclination ($\theta - 45$ degrees) of the mirror 5 with respect to the reference 45-degree position and also a function of the point $Q_5$. The image formation point for the ray of light 43 travelling through the points $Q_5 O_2$ is thus defined as the point where the ray of light 43 as reflected from the mirror 5 tilted out of position intersects the first image formation plane 6. The deviation $\Delta$ of the viewfinder image from the VF optical axis $C_1$-$C_2$ can therefore be derived.

Figure 18:
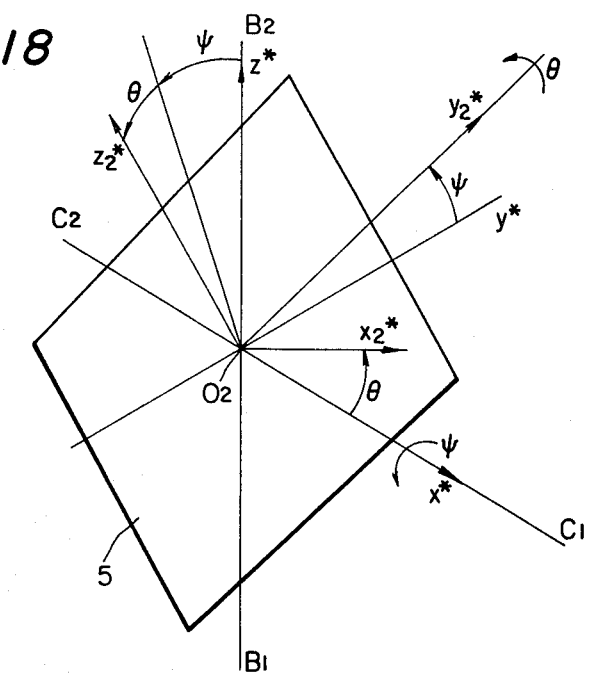
FIG. 18 is a diagrammatic view illustrating a three-dimensional analysis of such a viewfinder image deviation.

The foregoing two-dimensional analysis is applicable in principle to a three-dimensional analysis which will now be described in deriving equations to find deviations of a viewfinder image from the VF optical axis. As shown in FIG. 18, there is established a coordinate system $x^*y^*z^*$ having a coordinate axis $x^*$ on the VF optical axis $C_1$-$C_2$, a coordinate axis $z^*$ on the VF master optical axis $B_1$-$B_2$, and a coordinate axis $y^*$ extending perpendicularly to both the axis $x^*$, $y^*$ with a point $O_2$ being the origin. Another coordinate system $x_2^* y_2^* z_2^*$ is created by rotating the coordinate system $x^*y^*z^*$ about the coordinate axis $x^*$ and then about the coordinate axis $y_2^*$ is displaced, the mirror 5 having a reflecting surface lying a plane that contains the coordinate axes $y_2^*$, $z_2^*$.

Let the coordinates of a point $Q_5$ be ($x^*$, $y^*$, $z^*$) in the coordinate system $x^*y^*z^*$, and be ($x_2^*$, $y_2^*$, $z_2^*$) in the coordinate system $x_2^* y_2^* z_2^*$ through coordinate transformation. The virtual image $Q_5$, formed of the point $Q_5$ by the mirror 5 has coordinates ($-x_2^*$, $y_2^*$, $z_2^*$). Coordinates ($x^*$, $y^*$, $z^*$) of the point $Q_5$, expressed in the coordinate system $x^*y^*z^*$ through coordinate are given as follows:

$$\begin{pmatrix} \bar{x}^* \\ \bar{y}^* \\ \bar{z}^* \end{pmatrix} = \begin{pmatrix} 1 & 0 & 0 \\ 0 & \cos\psi & -\sin\psi \\ 0 & \sin\psi & \cos\psi \end{pmatrix} \begin{pmatrix} \cos\theta & 0 & -\sin\theta \\ 0 & 1 & 0 \\ \sin\theta & 0 & \cos\theta \end{pmatrix} \tag{33}$$

$$\begin{pmatrix} -1 & 0 & 0 \\ 0 & 1 & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix}$$

$$\begin{pmatrix} 1 & 0 & 0 \\ 0 & \cos\psi & \sin\psi \\ 0 & -\sin\psi & \cos\psi \end{pmatrix} \begin{pmatrix} x^* \\ y^* \\ z^* \end{pmatrix}$$

Reducing the above equation, $$\begin{pmatrix} \bar{x}^* \\ \bar{y}^* \\ \bar{z}^* \end{pmatrix} = - \begin{pmatrix} \cos2\theta & -\sin\psi\sin2\theta, \\ -\sin\psi\sin2\theta, & -\cos^2\psi - \sin^2\psi\cos2\theta, \\ \cos\psi\sin2\theta & -\sin\psi\cos\psi(1 - \cos2\theta), \end{pmatrix} \tag{34}$$

$$\left. \begin{array}{c} \cos\psi\sin\theta \\ -\cos\psi\sin\psi(1 - \cos2\theta) \\ -\sin^2\psi - \cos^2\psi\cos2\theta \end{array} \right) \begin{pmatrix} x^* \\ y^* \\ z^* \end{pmatrix}$$

As shown in FIG. 17, the ray of light 43 passing through the points $Q_5 O_2$ is reflected by the mirror 5 to go in the direction of the line $Q_5 O_2$ before reaching the first image formation plane 6. The point where the ray of light 43 crosses the first image formation plane 6 serves as an image formation point for a beam of light including the ray of light 43. Let the distance between the points $Q_5$ and $O_2$ on the $z^*$-axis be 1, and let the distance between the points $O_2$ and $Q_6$ on the $z^*$-axis be l, $Q_6$ being the image formation point available if there were no mirror 5 present. Coordinates ($Y^*$, $Z^*$) of the point Q in the coordinate system $y^* z^*$ are given as follows:

$$\begin{pmatrix} Y^* \\ Z^* \end{pmatrix} = -l \begin{pmatrix} \bar{y}^* \\ \bar{z}^* \end{pmatrix} \tag{35}$$

As described above, the ray of light travelling through the points $Q_5O_2$ along the VF master optical axis $B_1$–$B_2$ would form an image on the VF optical axis $C_1$–$C_2$ at the first image formation plane 6 if the mirror 5 were not tilted out of position. With the mirror 5 tilted about the x*-axis and the $y_2$*-axis through the angles of $\psi$ and ($\theta - 45$ degrees), respectively, the image formation point for the ray of light as reflected from the tilted mirror 5 is spaced apart from the VF optical axis $C_1$–$C_2$ by a distance which constitutes a deviation of a viewfinder image from the VF optical axis $C_1$–$C_2$. Let the coordinates of the point $Q_5$ be $(0, 0, -1)$, and the deviation $(Y^*, Z^*)$ from the optical axis can be expressed from the equations (34), (35) by:

$$\begin{pmatrix} Y^* \\ Z^* \end{pmatrix} = -l \begin{pmatrix} -\cos\psi\sin\psi(1 - \cos 2\theta) \\ -\sin^2\psi - \cos^2\cos 2\theta \end{pmatrix} \quad (36)$$

It is assumed that there are two points $Q_5$, $P_5$ ($P_5$ being not illustrated) on a plane containing the y*-axis and the z*-axis, and rays of light travelling through the points $Q_5$, $O_2$ and $P_5O_2$ form images respectively at points Q, P. If the mirror 5 were not tilted out of position, a straight line QP would extend parallel to the y*-axis. However, with the mirror 5 tilted, the straight line QP extends at an angle to the y*-axis, which constitutes an image inclination (See FIG. 14). Let the coordinates of the points Q, P be $(Y_1^*, Z_1^*)$, $(Y_2^*, Z_2^*)$, respectively, and let the coordinates of the points $Q_5$, $P_5$ be $(0, 0, -1)$, $(0, -1, -1)$, and the coordinates $Y_1^*, Z_1^*$ can be given by the equation (36) and the coordinates $Y_2^*, Z_2^*$ can be expressed by the following equation:

$$\begin{pmatrix} Y_2^* \\ Z_2^* \end{pmatrix} = -l \begin{pmatrix} -\cos^2\psi - \sin^2\psi\cos 2\theta - \cos\psi\sin\psi(1 - \cos 2\theta) \\ -\sin\psi\cos\psi(1 - \cos 2\theta) - \sin^2\psi - \cos^2\psi\cos 2\theta \end{pmatrix} \quad (37)$$

The image inclination H is as follows:

$$H = \tan^{-1}\frac{Z_2^* - Z_1^*}{Y_2^* - Y_1^*} \quad (38)$$

$$= \tan^{-1}\frac{\sin\psi\cos\psi(1 - \cos 2\theta)}{\cos^2\psi + \sin^2\psi\cos 2\theta}$$

When $\psi$ is small and $\theta$ is close to 45 degrees, approximate solutions to the above equations are given by:

$Y_1^* = 0.01745 l(1 - \cos 2\theta)\psi$ $Z_1^* = 0.0349 l(\cos^2\psi 45 - \theta)$ $H = (1 - \cos 2\theta)\psi \quad (39)$ The above solutions can approximately be expressed as follows:

$Y_1^* = 0.01745 l\psi$ $Z_1^* = 0.0349 l(45 - \theta)$ $H = \psi \quad (40)$

A review of the equations (40) shows that $Y_1^*$ and H are affected solely by $\psi$ and $Z_1^*$ is affected solely by $\theta$.

When the prism 3 and the mirror 5 are tilted out of their normal positions, combined deviations and inclinations of a viewfinder image result. Therefore, desired degrees of viewfinder image deviation and inclination can be attained by controlling the tilting of the prism 3 and the mirror 5. Assuming, for example, that desired horizontal and vertical deviations are expressed respectively as $\Delta y$, $\Delta z$, a desired image inclination as $\Delta H$, horizontal and vertical deviations, image inclination, and angles of angular movement caused by and of the prism 3 and the mirror 5 respectively as $\Delta y_1$, $\Delta z_1$, $\Delta H_1$, $\psi_1$, $\theta_1$, and $\Delta y_2$, $\Delta z_2$, $\Delta H_2$, $\psi_2$, $\theta_2$, the following equations are given:

$$\Delta y = \Delta y_1 + \Delta y_2 \quad (41)$$

$$\Delta z = \Delta z_1 + \Delta z_2 \quad (42)$$

$$\Delta H = \Delta H_1 + \Delta H_2 \quad (43)$$

When $\psi$ and $\theta$ are close to 0 and 45 degrees, respectively, $\Delta z$ is approximately a function of $\theta$, and $\Delta y$ and $\Delta H$ are mainly a function of $\psi$. This can be indicated by substituting the equations (32) and (40) into the equations (41), (42), and (43) to create the following equations:

$$\Delta y = -0.01745 (fm\psi_1 - l\psi_2) \quad (44)$$

$$\Delta z = -0.0349\{fm(45 - \theta_1) - l(45 - \theta_2)\} \quad (45)$$

$$\Delta H = -\psi_1 + \psi_2 \quad (46)$$

It will be seen from the equation (45) that a vertical deviation of a viewfinder image from the VF optical image can be corrected by either the prism 3 or the mirror 5, and from the equations (44) and (46) that $\psi_1$ and $\psi_2$ can be found if $\Delta y$ and $\Delta H$ are known. When $\psi_1 = \psi_2 = \psi$, the image inclination $\Delta H$ is zero, and at this time the equation (44) becomes:

$$y = -0.01745 (fm - l)\psi \quad (47)$$

$$\therefore \overline{\psi} = \frac{\Delta y}{-0.01745(fm - l)}$$

This equation gives $\psi$ which will eliminate the image inclination and produces the horizontal deviation $\Delta y$ of a viewfinder image.

When $l = fm$ in the equations (44), (45), and (46), these equations become:

$\Delta y = -0.01745(\psi_1 - \psi_2)fm$ $\Delta z = 0$ $\Delta H = -\psi_1 + \psi_2 \quad (48)$ Therefore, when $\psi_1 = \psi_2$, then $\Delta y = 0$ and $\Delta H = 0$, so that the image inclination and the image deviation from the VF optical axis can be adjusted at the same time.

A manner in which the single-lens reflex viewfinder of the present invention is adjusted on the basis of the foregoing optical analysis will now be described. In order to eliminate the image inclination, $\psi$ for the prism 3 and that for the mirror 5 are equalized by angularly moving either the prism 3 about the VF master optical axis $B_1$–$B_2$ or the mirror 5 about the VF optical axis $C_1$–$C_2$. After the above adjustment, the horizontal image deviation are in many cases different from a desired horizontal deviation $\Delta y$. Assuming that the difference is given as C, attaining the desired horizontal deviation $\Delta y$ requires $\psi$ for the prism 3 and the mirror 5 to be adjusted again by $\Delta\psi$, which can be expressed as follows:

$$\Delta\psi = \frac{-C}{0.01745\,(fm - l)} \quad (49)$$

Figure 19:
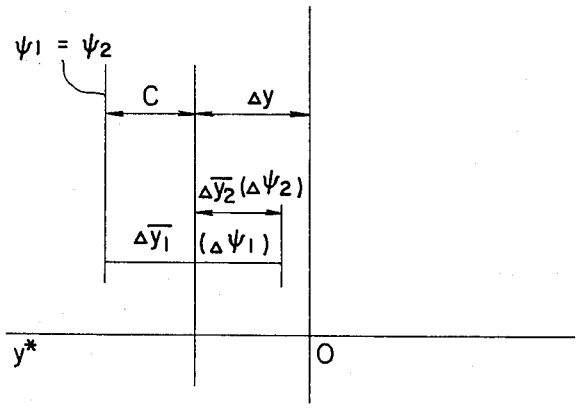
FIG. 19 is a view showing the way in which the single-lens reflex viewfinder of the invention is adjusted.

On first adjusting $\Delta\psi$ with the prism 3, a displacement $\Delta y_1$ of the optical axis as shown in FIG. 19 is given by the following equation:

$$\Delta\bar{y}_1 = -0.01745 fm \times \Delta\psi_1 \quad (50)$$

$$= \frac{-fm}{fm - l}\, C$$

Shifting the optical axis by $\Delta y_1$ results in an angular displacement by $\Delta\psi_1$. By angularly moving the mirror 5 to bring the horizontal deviation into conformity with $\Delta y$, $\Delta\psi_1 = \Delta\psi_2$ and $\Psi_1 = \Psi_2 = \psi$, with the results that the image inclination becomes zero and the horizontal deviation $\Delta y$ is reached.

When $fm = 2l$, the equation (50) becomes:

$$\Delta y_1 = -2C \quad (51)$$

On first adjusting $\Delta\psi$ with the mirror 5, a displacement $\Delta y_2$ of the optical axis is given by the following equation:

$$\Delta\bar{y}_2 = +0.01745 l \times \Delta\psi_2 \quad (52)$$

$$= +\frac{l}{fm - l}\, C$$

Shifting the optical axis by $\Delta y_2$ results in an angular displacement by $\Delta\psi_2$. By angularly moving the prism 3 to bring the horizontal deviation into conformity with $\Delta y$, $\Delta\psi_1 = \Delta\psi_2$ and $\psi_1 = \psi_2 = \psi$, with the results that the image inclination becomes zero and the horizontal deviation $\Delta y$ is attained.

When $fm = 2l$, the equation (52) becomes:

$$\Delta y_2 = C \quad (53)$$

With the foregoing adjustment, the relationship $\psi_1 = \psi_2$ is reached by first angularly moving the prism 3 or the mirror 5, and thereafter the prism 3 and the mirror 5 are independently moved for adjustment. However, after the relationship $\psi_1 = \psi_2$ has been attained, the prism 3 and the mirror 5 may be angularly moved in ganged relation in opposite directions through the angle of $\psi_1$ or $\psi_2$, so that optical axis correction can be accomplished with the image inclination remaining zero.

Figure 20:
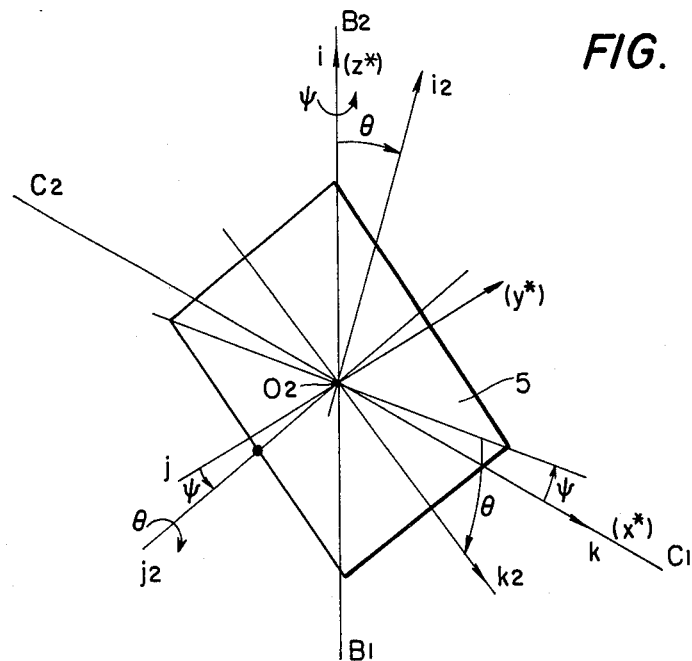
FIGS. 20 and 21 are diagrammatic views illustrative of another three-dimensional analysis of a deviation of a viewfinder image from an optical axis.

The above analysis has been directed to the situation in which the mirror 5 is angularly moved about the VF optical axis $C_1$–$C_2$. A three-dimensional analysis of angular movement of the mirror 5 about the VF master optical axis $B_1$–$B_2$ will now be described. As shown in FIG. 20, a coordinate system ijk having coordinate axes, i, j, and k is transformed into another coordinate system $i_2 j_2 k_2$ by being angularly moved first about the i-axis through an angle of $\psi$ and then about a $j_2$-axis through an angle of $\theta$. The mirror 5 has a reflecting surface lying in a plane containing the $j_2$-axis and $k_2$-axis of the coordinate system $i_2 j_2 k_2$. Let the coordinates of a point $Q_7$ (FIG. 21) be (i, j, k) in the coordinate system ijk, and be $(i_2, j_2, k_2)$ in the coordinate system $i_2 j_2 k_2$. The mirror 5 forms a virtual image $Q_7'$ of the point $Q_7$, the point $Q_7'$ having coordinates $(-i_2, j_2, k_2)$. The coordinates of the virtual image $Q_7'$ can be expressed in terms of the coordinate system ijk by transforming the coordinates (i, j, k) of the point $Q_7$ into the coordinates system $i_2 j_2 k_2$, changing the coordinate $i_2$ to the coordinate $-i_2$, and transforming the resulting coordinates back into corresponding coordinates in the coordinate system ijk. Coordinates (i, j, k) of the point $Q_7'$ in the coordinate system ijk are given by the following equation:

$$\begin{pmatrix} \bar{i} \\ \bar{j} \\ \bar{k} \end{pmatrix} = \begin{pmatrix} 1 & 0 & 0 \\ 0 & \cos\psi & -\sin\psi \\ 0 & \sin\psi & \cos\psi \end{pmatrix} \begin{pmatrix} \cos\theta & 0 & -\sin\theta \\ 0 & 1 & 0 \\ \sin\theta & 0 & \cos\theta \end{pmatrix} \quad (54)$$

$$\begin{pmatrix} -1 & 0 & 0 \\ 0 & 1 & 0 \\ 0 & 0 & 1 \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 1 & 0 & 0 \\ 0 & \cos\psi & \sin\psi \\ 0 & -\sin\psi & \cos\psi \end{pmatrix} \begin{pmatrix} i \\ j \\ k \end{pmatrix}$$

The above equation (54) can be reduced to:

$$\begin{pmatrix} \bar{i} \\ \bar{j} \\ \bar{k} \end{pmatrix} = -\begin{pmatrix} \cos 2\theta, & -\sin\psi\sin 2\theta, \\ -\sin\psi\sin 2\theta, & -\cos^2\psi - \sin^2\psi\cos 2\theta, \\ \cos\psi\sin 2\theta, & -\sin\psi\cos\psi(1 - \cos 2\theta), \end{pmatrix} \quad (55)$$

$$\begin{pmatrix} -\cos\psi\sin 2\theta \\ -\cos\psi\sin\psi(1 - \cos 2\theta) \\ -\sin^2\psi - \cos^2\psi\cos 2\theta \end{pmatrix} \begin{pmatrix} i \\ j \\ k \end{pmatrix}$$

Figure 21:
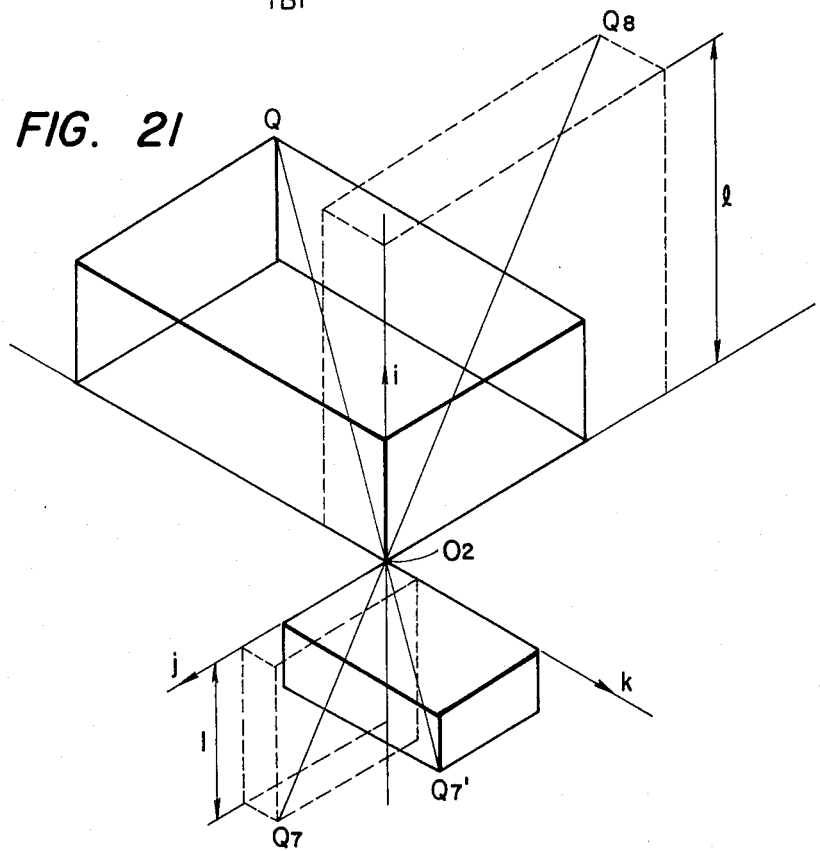
Figure 22:
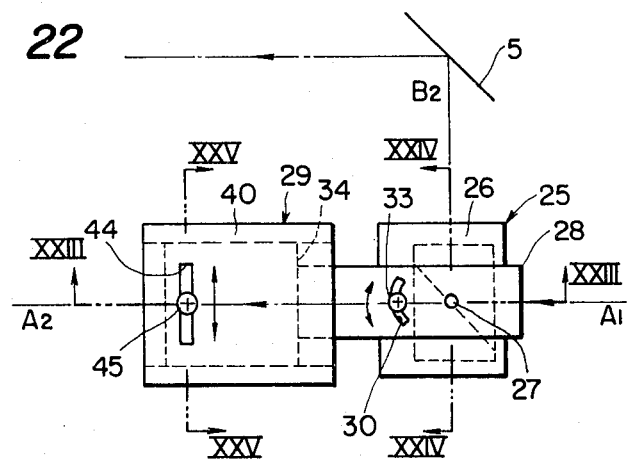
FIG. 22 is a side elevational view of an adjustable prism assembly.

A ray of light passing through the points $Q_7$, $O_2$ is reflected by the mirror 5 to travel in the direction of a line extending through the points $Q_7'$, $O_2$. The ray of light as reflected by the mirror 5 crosses the first image formation plane at a point Q where a beam of light including the above ray of light forms an image, as shown in FIG. 21. Let the distance from the point $Q_7$ to the point $O_2$ be 1, and let the distance from the point $O_2$ to a point $Q_8$ be 1, $Q_8$ being the image formation point available if there were no mirror 5 present.

Coordinates (J, I) of the point Q are given as follows:

$$\begin{pmatrix} J \\ I \end{pmatrix} = -l \begin{pmatrix} \bar{j} \\ \bar{i} \end{pmatrix} \quad (56)$$

Coordinates (Y*, Z*) of the point Q in the coordinate system y*z* are given by:

$$\begin{pmatrix} Y^* \\ Z^* \end{pmatrix} = \begin{pmatrix} -J \\ I \end{pmatrix} = -l \begin{pmatrix} -\bar{j} \\ \bar{i} \end{pmatrix} \quad (57)$$

If the point $Q_7$ were on the VF master optical axis $B_1$–$B_2$ and the mirror 5 were not tilted out of position, a ray of light travelling through the points $Q_7$, $O_2$ along the VF master optical axis $B_1$–$B_2$ would form an image on the VF optical axis $C_1$–$C_2$ at the first image formation plane 6 of the viewfinder master lens. When the mirror 5 is tilted about the i-axis and the $j_2$-axis through $\psi_1$ and $(\theta - 45$ degrees), respectively, the distance by which the image formation point is spaced apart from the VF optical axis constitutes a deviation of a viewfinder image from the VF optical axis. Let the coordinates of the point $Q_7$ be $(-1, 0, 0)$, and the deviation (Y*, Z*) from the optical axis can be expressed from the equations (55), (56), and (57) by $$\begin{pmatrix} Y^* \\ Z^* \end{pmatrix} = -l \begin{pmatrix} +\sin\psi\sin2\theta \\ +\cos2\theta \end{pmatrix} \tag{58}$$

It is assumed that there are two points $Q_9$, $P_9$ on a plane containing the i-axis and the j-axis, and rays of light travelling through the points $Q_9O_2$ and $P_9O_2$ form images respectively at points Q, P. If the mirror 5 were not tilted out of position, a straight line QP would extend parallel to the y*-axis. However, with the mirror 5 tilted, the straight line QP extends at an angle to the y*-axis, which constitutes an image inclination. Let the coordinates of the points Q, P be $(Y_1^*, Z_1^*)$, $(Y_2^*, Z_2^*)$, respectively, and let the coordinates of the points $Q_9=(i,j,k)$ and $P_9=(i,j,k)$ be $(-1, 0, 0)$ and $(-1, +1, 0)$, respectively. The coordinates $(Y_2^*, Z_2^*)$ can be expressed from the equation (58) by the following equation:

$$\begin{pmatrix} Y_2^* \\ Z_2^* \end{pmatrix} = -l \begin{pmatrix} +\sin\psi\sin2\theta - \cos^2\psi - \sin^2\psi\cos2\theta \\ \cos2\theta + \sin\psi\sin2\theta \end{pmatrix} \tag{59}$$

The image inclination H is as follows:

$$H = \tan^{-1} \frac{\sin\psi\sin2\theta}{-\cos^2\psi - \sin^2\psi\cos2\theta} \tag{60}$$

When $\psi$ is small and $\theta$ is close to 45 degrees, approximate solutions to the above equations are given by:

$$\left.\begin{matrix} Y_1^* = -0.01745l\psi \\ Z_1^* = -0.03495l(45 - \theta) \\ H = -\psi \end{matrix}\right\} \tag{61}$$

A study of the equations (61) indicates that $Y_1^*$ and H are greatly affected by $\psi$ and $Z_1^*$ is solely a function of $\theta$.

When the prism 3 and the mirror 5 are tilted out of their normal positions, combined deviations and inclinations of a viewfinder image result. Therefore, desired degrees of viewfinder image deviation and inclination can be attained by controlled the tilting of the prism 3 and the mirror 5. Assuming, for example, that desired horizontal and vertical deviations are expressed respectively as $\Delta y$, $\Delta z$, a desired image inclination as $\Delta H$, horizontal and vertical deviations, image inclination, and angles of angular movement caused by and of the prism 3 and the mirror 5 respectively as $\Delta y_1$, $\Delta z_1$, $\Delta H_1$, $\psi_1$, $\theta_1$, and $\Delta y_2$, $\Delta z_2$, $\Delta H_2$, $\psi_2$, $\theta_2$, the angles $\psi_1$, $\theta_1$, $\psi_2$, $\theta_2$ with respect to the deviation $\Delta z$ and the image inclination H are given as solutions to the following equations:

$$\Delta y = \Delta y_1 + \Delta y_2 \tag{62}$$

$$\Delta z = \Delta z_1 + \Delta z_2 \tag{63}$$

$$\Delta H = \Delta H_1 + \Delta H_2 \tag{64}$$

When $\psi$ and $\theta$ are close to 0 and 45 degrees, respectively, $\Delta z$ is approximately a function of $\theta$, and $\Delta y$ and $\Delta H$ are mainly a function of $\psi$. The above equations (62), (63), (64) are reduced to:

$$\Delta y = +0.01745(fm\psi_1 - l\psi_2) \tag{65}$$

$$\Delta z = +0.0349\{fm(45-\theta_1) - l(45-\theta_2)\} \tag{66}$$

$$\Delta H = \psi_1 - \psi_2$$

It will be seen from the equation (66) that a vertical deviation of a viewfinder image from the VF optical image can be corrected by either the prism 3 or the mirror 5, and from the equations (44) and (46) that $\psi_1$ and $\psi_2$ can be found if $\Delta y$ and $\Delta H$ are known. When $\psi_1=\psi_2=\psi$, the image inclination $\Delta H$ is zero, and at this time the equation (65) becomes:

$$\Delta y = +0.01745 (fm - l)\psi \tag{68}$$

$$\therefore \overline{\psi} = \frac{\Delta y}{-0.01745(fm - l)}$$

This equation gives $\psi$ which will eliminate the image inclination and produces the horizontal deviation $\Delta y$ of a viewfinder image.

The way in which the single-lens reflex viewfinder is adjusted by angularly moving the mirror 5 about the VF master optical axis $B_1$-$B_2$ will now be described. First, an adjustment is made to attain the relationship $\psi_1=\psi_2=\psi$ in order to eliminate the image inclination. This can be achieved by angularly moving either the prism 3 about the VF master optical axis $B_1$-$B_2$ or the mirror 5 about the VF master optical axis $B_1$-$B_2$.

After the above adjustment, the horizontal image deviation are in many cases different from a desired horizontal deviation $\Delta y$. Assuming that the difference is given as C, attaining the desired horizontal deviation y requires $\psi$ for the prism 3 and the mirror 5 to be adjusted again by $\Delta\psi$, which can be expressed as follows:

$$\Delta\psi = \frac{-C}{0.01745(fm - l)} \tag{69}$$

On first adjusting $\Delta\psi$ with the prism 3, a displacement $\Delta y_1$ of the optical axis as shown in FIG. 19 is given by the following equation:

$$\Delta\overline{y}_1 = +0.01745 fm \times \Delta\psi_1 \tag{70}$$

$$= \frac{-fm}{fm - l} C$$

Shifting the optical axis by $\Delta y_1$ results in an angular displacement by $\Delta\psi_1$. By angularly moving the mirror 5 to bring the horizontal deviation into conformity with $\Delta y$, $\Delta\psi_1=\Delta\psi_2$ and $\psi_1=\psi_2$, with the results that the image inclination becomes zero and the horizontal deviation $\Delta y$ is reached.

When fm=2l, the equation (70) becomes:

$$\Delta y_1 = -2C \tag{71}$$

On first adjusting $\Delta\psi$ with the mirror 5, a displacement $\Delta y_2$ of the optical axis is given by the following equation:

$$\Delta\overline{y}_2 = -0.01745l \times \Delta\psi_2 \tag{72}$$

$$= + \frac{l}{fm - l} C$$

Shifting the optical axis by $\Delta y_2$ results in an angular displacement by $\Delta \psi_2$. By angularly moving the prism 3 to bring the horizontal deviation into conformity with $\Delta y$, $\Delta \psi_1 = \Delta \psi_2$ and $\psi_1 = \psi_2 = \psi$, with the results that the image inclination becomes zero and the horizontal deviation $\Delta y$ is attained.

When $fm = 2l$, the equation (72) becomes:

$$\Delta y_2 = C \quad (73)$$

With the foregoing adjustment, the relationship $\psi_1 = \psi_2$ is reached by first angularly moving the prism 3 or the mirror 5, and thereafter the prism 3 and the mirror 5 are independently moved for adjustment. However, after the relationship $\psi_1 = \psi_2$ has been attained, the prism 3 and the mirror 5 may be angularly moved in ganged relation in opposite directions through the angle of $\psi_1$ or $\psi_2$, so that optical axis correction can be accomplished with the image inclination remaining zero.

When there are horizontal and vertical deviations of a viewfinder image, the single-lens reflex viewfinder of the invention will be adjusted as follows: First, the mirror 5 is angularly moved about the VF optical axis $C_1-C_2$ to correct the horizontal image deviation substantially without shifting the optical axis vertically. Then, the mirror 5 is angularly moved about an axis extending perpendicularly to both the VF optical axis $C_1-C_2$ and the VF master optical axis $B_1-B_2$ involving substantially no vertical shifting of the optical axis. The above adjustment is based on the principles expressed by the equations (40). A vertical image deviation can also be corrected by translating the mirror 5 along either the VF optical axis $C_1-C_2$ or the VF master optical axis $B_1-B_2$.

The mirror 5 may have its reflecting surface lying through the second principal point of the viewfinder master lens 4. With such an arrangement, $fm = l$ and hence the equations (48) are rendered applicable, so that the mirror 5 may be angularly moved about the VF optical axis $C_1-C_2$ or the prism 3 may be angularly moved about the zoom optical axis $A_1-A_2$ for simultaneous adjustment of an image deviation from the optical axis and an image inclination.

FIGS. 22 through 28 shows various prism and mirror assemblies which are angularly movable.

Figure 23:
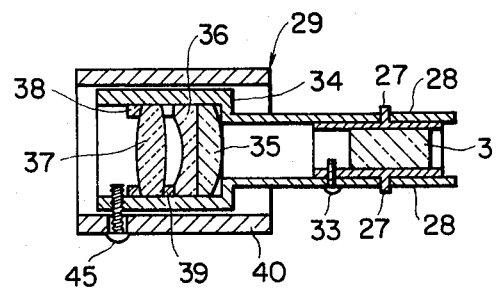
FIGS. 23, 24, and 25 are cross-sectional views taken along lines XXIII—XXIII, XXIV—XXIV, and XXV—XXV of FIG. 22, respectively.
Figure 24:
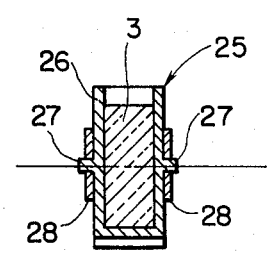
Figure 25:
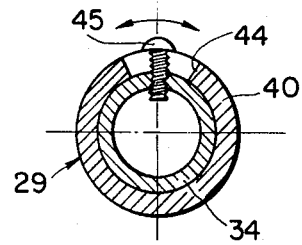

In FIGS. 22 through 25, a prism assembly 25 includes a housing 26 in which the prism 3 is mounted (as shown in FIG. 23), the housing 26 having a pair of opposite pivot pins 27, 27 pivotably fitted in holes in a pair of parallel support arms 28, 28 extending from a master lens assembly 29 along the zoom optical axis $A_1-A_2$. The pivot pins 27, 27 extend in a direction perpendicular to both the zoom optical axis $A_1-A_2$ and the VF master axis $B_1-B_2$. One of the support arms 28 has an arcuate slot 30 through which loosely extends a screw 33 threaded into the housing 26 as best shown in FIG. 23. The prism assembly 25 is thus angularly movable about the pivot pins 27, 27 upon loosening the screw 33, and can be fixed in a selected angular position with respect to the support arms 28, 28 by retightening the screw 33. The master lens assembly 29 comprises a cylindrical casing 34 housing therein a plurality of lenses 35-37 held in position by a lens stop 38, the lenses 36, 37 being axially spaced from each other by a spacer 39. The cylindrical casing 34 is angularly movably disposed in a tubular master lens holder 40 secured to the VTR camera and having a circumferential slot 44 through which a screw 45 loosely extends radially into threaded engagement with the cylindrical casing 34. Upon loosening the screw 45, the cylindrical casing 34 is angularly movable in the tubular master lens holder 40 about the zoom optical axis $A_1-A_2$. Such angular movement of the casing 34 causes the prism assembly 25 to angularly move about the zoom optical axis $A_1-A_2$.

Figure 26:
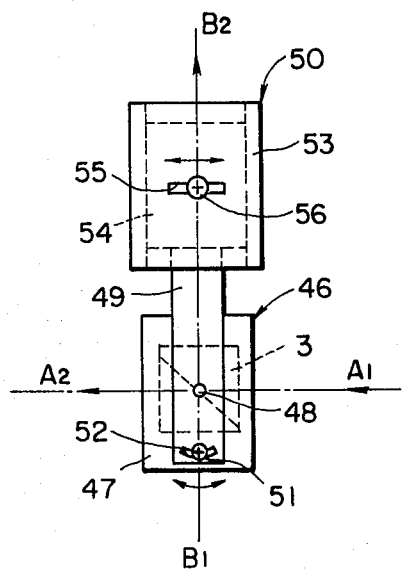
FIG. 26 is a side elevational view of another adjustable prism assembly.

Another prism assembly 46 shown in FIG. 26 comprises a housing 47 accommodating therein the prism 3 and pivotably supported by a pair of pivot pins 48 (one shown) on a pair of support arms (one shown) 49 projecting from a viewfinder master lens assembly 50, the pins 48 extending perpendicularly to both the zoom optical axis $A_1-A_2$ and the VF master optical axis $B_1-B_2$. A screw 51 extends loosely through an arcuate slot 52 in one of the support arms 49 into threaded engagement with the housing 47 of the prism assembly 46. Thus, the prism assembly 46 is allowed to turn about the pivot pins 48 when the screw 51 is loosened. The viewfinder master lens assembly 50 includes a tubular lens holder 53 attached to the VTR camera and in which there is angularly movably disposed a cylindrical casing 54 housing therein a viewfinder master lens (not shown), the support arms 49 extending from the casing 54. The tubular holder 53 had a circumferential slot 55 receiving therein a screw 56 extending threadedly into the cylindrical casing 54. When the screw 56 is loosened, the cylindrical casing 54 is permitted to turn about the VF master optical axis $B_1-B_2$, so that the prism assembly 46 can angularly move about the VF master optical axis $B_1-B_2$.

Figure 27:
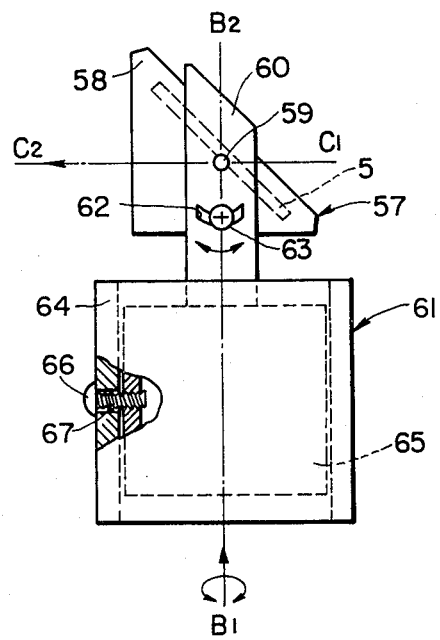
FIG. 27 is a side elevational view of an adjustable mirror assembly.

FIG. 27 illustrates a mirror assembly 57 including a mirror box 58 housing therein the mirror 5 and pivotably mounted by a pair of pivot pins 59 (one shown) on a pair of support arms 60 (one shown) of a viewfinder master lens assembly 61. One of the support arms 60 has an arcuate slot 62 through which loosely extends a screw 63 that is threaded into the mirror box 58. Loosening the screw 63 allows the mirror assembly 57 to turn about the pivot pins 59 which extend perpendicularly to both the VF optical axis $C_1-C_2$ and the VF master optical axis $B_1-B_2$. The viewfinder master lens assembly 61 comprises a tubular lens holder 64 fixedly mounted on the VTR camera and supporting rotatably therein a cylindrical casing 65 holding a viewfinder master lens (not illustrated), the support arms 60 extending from the cylindrical casing 65. A screw 66 is inserted loosely through a circumferential slot 67 in the tubular lens holder 64 and threaded into the cylindrical casing 65. As the screw 66 is loosened, the cylindrical casing 65 is allowed to turn in the tubular holder 64 about the VF master optical axis $B_1-B_2$, and hence the mirror assembly 57 is permitted to turn about the VF master optical axis $B_1-B_2$.

Figure 28:
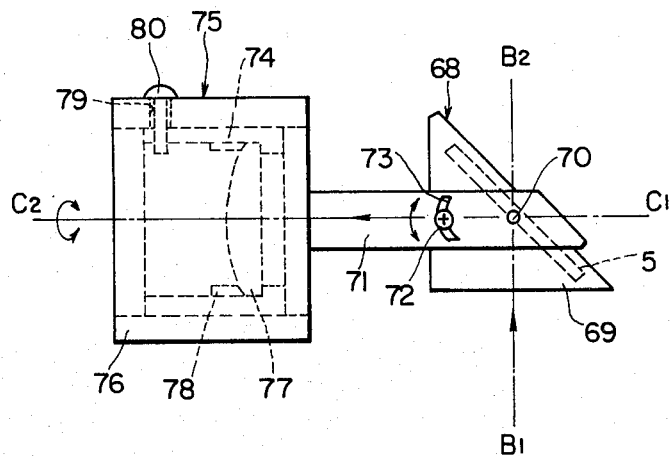
FIG. 28 is a side elevational view of another adjustable mirror assembly.

As illustrated in FIG. 28, another mirror assembly 68 has a mirror box 69 housing the mirror 5 therein and a pair of pivot pins 70 (one illustrated) pivotably supported on a pair of arms 71 (one illustrated), the pins 70 extending perpendicularly to both the VF master optical axis $B_1-B_2$ and the VF optical axis $C_1-C_2$. The mirror assembly 68 is allowed to turn on the pivot pins 70 upon loosening a screw 72 extending loosely through an arcuate slot 73 in one of the support arms 71 into threaded engagement with the mirror box 69. The support arms 71 extend from a cylindrical casing 74 of a field lens assembly 75 that includes a tubular field lens holder 76 in which the cylindrical casing 74 is rotatably mounted. The cylindrical casing 74 houses therein a field lens 77 held in position by a lens stop 78. The tubular field lens holder 76 has an arcuate slot 79 through which loosely extends a screw 80 that is threaded into the cylindrical casing 74. Upon loosening the screw 80, the cylindrical casing 74 is permitted to angularly move about the VF optical axis $C_1$-$C_2$, and the mirror assembly 68 is also allowed to turn about the VF optical axis $C_1$-$C_2$.

Deviations from the VF optical axis and inclinations of viewfinder images which are caused by machining and assembling errors of other parts than the prism 3 and the mirror 5 can also be corrected or adjusted by angularly moving the prism 3 and the mirror 5 about the optical axes in the single-lens reflex type viewfinder.

The prism 3 may be replaced with a mirror assembly including a small-size mirror capable of diverting a portion of light into the viewfinder system, and the mirror 5 may be replaced with a prism having a half-mirror surface. The present invention is equally applicable to ordinary still cameras and movie cameras other than VTR cameras.

Although certain preferred embodiments have been shown and described in detail, it should be understood that many changes and modifications may be made therein without departing from the scope of the appended claims.

What is claimed is:

1. A single-lens reflex type viewfinder for a camera, comprising:
   a main lens for passage therethrough of light along a first optical axis;
   an image pickup device disposed on said first optical axis;
   a prism for guiding a portion of the light to pass along a second optical axis extending substantially at a right angle to said first optical axis;
   a viewfinder master lens disposed on said second optical axis for passage therethrough of the light portion;
   a mirror for guiding the light portion to pass along a third optical axis extending substantially at a right angle to said second optical axis and parallel to said first optical axis; and
   an eyepiece disposed on said third optical axis for delivering a viewfinder image therethrough, said mirror being disposed on an image formation point of said viewfinder master lens so as to eliminate disagreement between the centers of a viewfinder image and an image focused on said image pickup device and also eliminte adjustment of the viewfinder.

2. A single-lens reflex type viewfinder according to claim 1, including a second prism having on a slant surface thereof a mirror coating which serves as said mirror.

3. A single-lens reflex type viewfinder according to claim 2, including a pair of lenses mounted on said second prism in axial alignment with said second and third optical axes.

4. A single-lens reflex type viewfinder according to claim 1, including a box in which said mirror is housed.

5. A single-lens reflex type viewfinder according to claim 4, including a pair of lenses mounted on said box in axial alignment with said second and third optical axes, respectively.

6. A single-lens reflex type viewfinder for a camera, comprising:
   a main lens for passage therethrough of light along a first optical axis;
   a prism for guiding a portion of the light to pass along a second optical axis extending substantially at a right angle to said first optical axis;
   a viewfinder master lens having first and second principal points and disposed on said second optical axis for passage therethrough of the light portion;
   a mirror for guiding the light portion to pass along a third optical axis extending substantially at a right angle to said second optical axis and parallel to said first optical axis, said mirror having a reflecting surface lying through said second principal point of said viewfinder master lens; and
   an eyepiece disposed on said third optical axis for delivering a viewfinder image therethrough.

7. A single-lens reflex type viewfinder for a camera, comprising:
   a main lens for passage therethrough of light along a first optical axis;
   a prism for guiding a portion of the light to pass along a second optical axis extending substantially at a right angle to said first optical axis;
   a viewfinder master lens disposed on said second optical axis for passage therethrough of the light portion;
   a mirror for guiding the light portion to pass along a third optical axis extending substantially at a right angle to said second optical axis and parallel to said first optical axis;
   an eyepiece disposed on said third optical axis for delivering a viewfinder image therethrough; and
   means for rotating said mirror in a single fixed plane about said second optical axis to adjust any horizontal deviation of the viewfinder image from said third optical axis.

8. A single-lens reflex type viewfinder for a camera, comprising:
   a main lens for passage therethrough of light along a first optical axis;
   a prism for guiding a portion of the light to pass along a second optical axis extending substantially at a right angle to said first optical axis;
   a viewfinder master lens disposed on said second optical axis for passage therethrough of the light portion;
   a mirror for guiding the light portion to pass along a third optical axis extending substantially at a right angle to said second optical axis and parallel to said first optical axis;
   an eyepiece disposed on said third optical axis for delivering a viewfinder image therethrough;
   means rotating said mirror in a single fixed plane about said second optical axis to attain a desired degree of horizontal deviation from said third optical axis; and
   means for rotating said prism in a single fixed plane about said first optical axis to attain a desired degree of inclination of the viewfinder image.

9. A single-lens reflex type viewfinder for a camera, comprising:
   a main lens for passage therethrough of light along a first optical axis;
   a prism for guiding a portion of the light to pass along a second optical axis extending substantially at a right angle to said first optical axis;

a viewfinder master lens disposed on said second optical axis for passage therethrough of the light portion;

a mirror for guiding the light portion to pass along a third optical axis extending substantially at a right angle to said second optical axis and parallel to said first optical axis;

an eypiece disposed on said third optical axis for delivering a viewfinder image therethrough; and means for rotating said prism in a single fixed plane about said second optical axis to adjust any horizontal deviation of the viewfinder image from said third optical axis.

10. A single-lens reflex type viewfinder for a camera, comprising:

a main lens for passage therethrough of light along a first optical axis;

a prism for guiding a portion of the light to pass along a second optical axis extending substantially at a right angle to said first optical axis;

a viewfinder master lens disposed on said second optical axis for passage therethrough of the light portion;

a mirror for guiding the light portion to pass along a third optical axis extending substantially at a right angle to said second optical axis and parallel to said first optical axis;

an eyepiece disposed on said third optical axis for delivering a viewfinder image therethrough;

means for rotating said prism in a single fixed plane about said second optical axis to adjust said second optical axis for thereby attaining a desired degree of horizontal deviation from said third optical axis; and means for rotating said mirror in a single fixed plane about said third optical axis to adjust said third optical axis for thereby attaining a desired degree of inclination of the viewfinder image.

11. A single-lens reflex type viewfinder for a camera, comprising:

a main lens for passage therethrough of light along a first optical axis;

a prism for guiding a portion of the light to pass along a second optical axis extending substantially at a right angle to said first optical axis;

a viewfinder master lens disposed on said second optical axis for passage therethrough of the light portion;

a mirror for guiding the light portion to pass along a third optical axis extending substantially at a right angle to said second optical axis and parallel to said first optical axis;

an eypiece disposed on said third optical axis for delivering a viewfinder image therethrough; and means for rotating said prism and said mirror in a single fixed plane about said second optical axis to adjust said second and third optical axes for thereby attaining desired degrees of horizontal deviation from said third optical axis and inclination of the viewfinder image.

12. A method of adjusting a single-lens reflex type viewfinder for a camera including a main lens for passage therethrough of light along a first optical axis, a prism for guiding a portion of the light to pass along a second optical axis extending substantially at a right angle to said first optical axis, a viewfinder master lens disposed on said second optical axis for passage therethrough of the light portion, a mirror for guiding the light portion to pass along a third optical axis extending substantially at a right angle to said second optical axis and parallel to said first optical axis, and an eyepiece disposed on said third optical axis for delivering a viewfinder image therethrough, said method comprising the steps of:

rotating said prism in a single fixed plane about said first optical axis; and rotating said mirror in a single fixed plane about said third optical axis, for thereby adjusting any horizontal deviation from said third optical axis and any inclination of the viewfinder image.

13. A method of adjusting a single-lens reflex type viewfinder for a camera including a main lens for passage therethrough of light along a first optical axis, a prism for guiding a portion of the light to pass along a second optical axis extending substantially at a right angle to said first optical axis, a viewfinder master lens disposed on said second optical axis for passage therethrough of the light portion, a mirror for guiding the light portion to pass along a third optical axis extending substantially at a right angle to said second optical axis and parallel to said first optical axis, and an eyepiece disposed on said third optical axis for delivering a viewfinder image therethrough, said method comprising the steps of:

rotating said mirror in a single fixed plane about said third optical axis to correct any horizontal deviation of the viewfinder image from said third optical axis; and rotating said mirror in a single plane about an axis extending perpendicularly to both said second and said third optical axis to correct any vertical deviation of the viewfinder image from said third optical axis.

14. A method of adjusting a single-lens reflex type viewfinder for a camera including a main lens for passage therethrough light along a first optical axis, a prism for guiding a portion of the light to pass along a second optical axis extending substantially at a right angle to said first optical axis, a viewfinder master lens disposed on said second optical axis for passage therethrough of the light portion, a mirror for guiding the light portion to pass along a third optical axis extending substantially at a right angle to said second optical axis and parallel to said first optical axis, and an eyepiece disposed on said third optical axis for delivering a viewfinder image therethrough, said method comprising the steps of:

angularly moving said mirror about said third optical axis to correct any horizontal deviation of the viewfinder image from said third optical image; and translating said mirror to correct any vertical deviation of the viewfinder image from said third optical image.

* * * * *